United States Patent [19]
Mitsuda et al.

[11] Patent Number: 5,623,362
[45] Date of Patent: Apr. 22, 1997

[54] ERBIUM-DOPED FIBER AMPLIFIER AND AN OPTICAL FIBER COMMUNICATION SYSTEM

[75] Inventors: Masahiro Mitsuda, Kyoto; Jun Ohya, Osaka, both of Japan

[73] Assignee: Matsushita Electric Industrial Co., Ltd., Kadoma, Japan

[21] Appl. No.: 693,859

[22] Filed: Aug. 5, 1996

Related U.S. Application Data

[63] Continuation of Ser. No. 240,324, May 10, 1994, abandoned.

[30] Foreign Application Priority Data

May 10, 1993 [JP] Japan ................................. 5-108028

[51] Int. Cl.⁶ ........................... G02B 6/28; H01S 3/30; H01S 3/094
[52] U.S. Cl. .................... 359/341; 359/134; 359/345; 372/6
[58] Field of Search ................. 359/134, 160, 359/341, 345; 372/6, 69, 70; 385/1

[56] References Cited

U.S. PATENT DOCUMENTS

| | | | |
|---|---|---|---|
| 5,128,800 | 7/1992 | Zizengibl | 372/6 |
| 5,140,456 | 8/1992 | Huber | 359/341 |
| 5,157,545 | 10/1992 | Hachel | 359/345 |
| 5,185,826 | 2/1993 | Delavaux | 359/341 |
| 5,245,690 | 9/1993 | Aida et al. | 372/6 |
| 5,287,216 | 2/1994 | Chirravuri et al. | 359/341 |
| 5,301,203 | 4/1994 | Schlie et al. | 372/55 |
| 5,367,587 | 11/1994 | Mizuochi et al. | 372/6 |
| 5,504,609 | 4/1996 | Alexander et al. | 359/133 |
| 5,521,753 | 5/1996 | Fahe et al. | 359/341 |

OTHER PUBLICATIONS

Sugaza et al, OAA paper FC3, Jun. 16, 1995, (Davos, Switzerland).

*Primary Examiner*—Nelson Moskowitz
*Attorney, Agent, or Firm*—Ratner & Prestia

[57] ABSTRACT

The erbium-doped fiber amplifier comprises: a first erbium-doped optical fiber pumped by 0.98 μm band light and amplifying the signal light; a first pump light source for producing the 0.98 μm band light; a first optical coupler for coupling the 0.98 μm band light with the signal light at an input portion of the first optical fiber; a second erbium-doped optical fiber pumped by 1.48 μm band light and amplifying the signal light; a second pump light source for producing the 1.48 μm band light; and a second optical coupler for coupling the 1.48 μm band light with the signal light at an output portion of the second optical fiber; wherein a pump light isolator is installed between the first optical fiber and the second optical fiber for blocking the passing of the 1.48 μm band light from the second optical fiber to the first optical fiber while allowing the passing of the signal light.

26 Claims, 16 Drawing Sheets

ERBIUM-DOPED FIBER AMPLIFIER AND AN OPTICAL FIBER COMMUNICATION SYSTEM

This application is a continuation of application Ser. No. 08/240,324 filed May 10, 1994, now abandoned.

BACKGROUND OF THE INVENTION

1. Field of the Invention

The present invention relates to an erbium-doped fiber amplifier pumped in the 0.98 μm and 1.48 μm bands and an optical fiber communication system having the same.

2. Description of the Related Art

Having many advantages over an electrical communication system, an optical fiber communication system has been actively studied and developed or already put into practical use in various fields. In such an optical fiber communication system, the propagation loss can be easily compensated by using erbium-doped fiber amplifiers which can directly amplify a light signal without converting it to an electrical signal.

Since the fiber amplifiers have a high saturated output, it is possible to increase the number of distribution ends in the entire optical system. Especially, when the fiber amplifiers are used for an optical subscriber system where information with a large capacity such as images is transmitted from a base station to home terminals or for a system called "Fiber To The Home", multi-channeling and multi-distribution can be more easily achieved. This contributes to facilitating the propagation of the system in the aspects of both the software and the cost. In the "Fiber To The Home" system, a multi-channel image signal transmission service called an optical CATV where the existing electrical CATV system has been developed to utilize optical transmission is predicted to be first put into practical use. Analog signal transmission is more advantageous for the above system than digital signal transmission because the former is compatible with the existing image information recording mode and is less expensive than the latter. Accordingly, the system adopting the analog mode is now being studied. The amplitude modulation or the frequency modulation is generally used for the analog signal transmission. In either case, the performance of the system depends on the carrier-to-noise ratio (CNR) and the distortion property. The CNR property is especially important for an AM-FDM (frequency division multiplexer) optical distribution system.

The fiber amplifier is essentially a low noise amplifier. Especially, it is known that, at 0.98 μm band pumping, the noise figure (NF) degrades to the quantum limit of 3 dB because the maximum population inversion is realized at this wavelength. This noise property of the fiber amplifier when pumped in the 0.98 μm band is reported, for example, in IEEE Photonics Technology Letters, vol. 2, No. 6, 1990, pp. 418–421.

It is also known that, at 1.48 μm band pumping, the conversion efficiency is high because the pump wavelength and the signal light wavelength are close to each other. As a result, high output can be easily obtained. Power requirements for erbium-doped fiber amplifiers pumped at various wavelengths are reported, for example, in IEEE Photonics Technology Letters, vol. 4, No. 1, 1992, pp. 46–49.

It is considered, therefore, that a hybrid pumped fiber amplifier pumped at both 0.98 μm and 1.48 μm may provide low noise and high output power properties simultaneously. A study on a hybrid pumped preamplifier is reported in Electronics Letters, vol. 28, No. 17, 1992, pp. 1642–1643. A study on a hybrid erbium-doped fiber in-line amplifier is reported in ECOC'91, paper WeC9-2, 1991, pp. 585–587. The latter includes an optical isolator inserted in the middle portion of an erbium-doped optical fiber for suppressing a feedback effect. As for a hybrid erbium-doped fiber post amplifier, it is reported that the NF property degrades when 1.48 μm pump light increases in The Institute of Electronics, Information and Communication Engineers, 1993 spring convention paper, No. 4, C-297. This paper proposes inserting an optical isolator in the middle portion of an erbium-doped optical fiber to prevent the lowering of the population inversion.

With the insertion of an optical isolator in the middle portion of an erbium-doped optical fiber, the output power and NF properties are improved for a fiber amplifier of a bidirectional pumping mode. This is because amplified spontaneous emission (ASE) propagating opposite to the direction of signal light is eliminated by the optical isolator. This is reported in The Institute of Electronics, Information and Communication Engineers, Optical Communication System Society, OCS92-27, 1992, pp. 9–16. However, since the ASE is suppressed under the high-input and high-output conditions required for a post amplifier, the effect of improving the properties by eliminating the ASE will be small for the post amplifier application.

An optical filter may be inserted in an end portion of a fiber amplifier pumped at 1.48 μm or 0.98 μm where a light signal has been amplified through an erbium-doped optical fiber for the purpose of eliminating beat noise generated by spontaneous emission. Such a fiber amplifier is reported in IEEE Photonics Technology Letters, vol. 2, No. 3, 1990, pp. 205–207.

It is obvious from the above description that a practical high-performance fiber amplifier can be obtained by utilizing the respective advantages of 0.98 μm and 1.48 μm pump wavelengths, thus increasing the output power and decreasing the NF of the amplifier.

The 0.98 μm/1.48 μm hybrid pumped fiber amplifier is theoretically considered to be effective for increasing the output power and decreasing the NF. In practice, however, when 1.48 μm pump light is increased to obtain a high output power, the NF property degrades. On the contrary, when an optical isolator is inserted in the middle portion of an erbium-doped optical fiber in order to decrease the NF, the output power decreases. Thus, it is difficult to obtain a hybrid pumped post amplifier with high output power and low NF properties.

One object of the present invention is to provide a 0.98 μm/1.48 μm hybrid pumped fiber amplifier with high output power and low NF properties by isolating pump light using an optical component with low insertion loss such as an optical filter, by using an erbium-doped optical fiber having a small emission cross section in the 1.48 μm band, or by pumping at a wavelength of the 1.48 μm band capable of providing a smaller emission cross section.

Another object of the present invention is to provide a light signal transmission system with enhanced capabilities of long-distance transmission and multi-distribution.

SUMMARY OF THE INVENTION

The erbium-doped fiber amplifier for amplifying signal light according to the present invention comprises: a first optical fiber doped with erbium ions and having an input portion and an output portion, the first optical fiber being pumped by 0.98 µm band light and amplifying the signal light; a first pump light source for producing the 0.98 µm band light; a first optical coupler for receiving the 0.98 µm band light from the first pump light source, and coupling the 0.98 µm band light with the signal light at the input portion of the first optical fiber; a second optical fiber doped with erbium ions and having an input portion and an output portion, the second optical fiber being pumped by 1.48 µm band light and amplifying the signal light; a second pump light source for producing the 1.48 µm band light; and a second optical coupler for receiving the 1.48 µm band light from the second pump light source, and coupling the 1.48 µm band light with the signal light at the output portion of the second optical fiber; wherein a pump light isolator is installed between the output portion of the first optical fiber and the input portion of the second optical fiber, and the pump light isolator blocks the passing of the 1.48 µm band light from the input portion of the second optical fiber to the output portion of the first optical fiber so that the 1.48 µm band light be smaller than the signal light in the first optical fiber, while the pump light isolator allows the passing of the signal light from the output portion of the first optical fiber to the input portion of the second optical fiber.

In one embodiment, the pump light isolator includes an optical filter.

In another embodiment, the pump light isolator includes an optical fiber-grating.

In another embodiment, the pump light isolator includes an optical isolator.

In another embodiment, the first pump light source includes a semiconductor laser.

In another embodiment, the second pump light source includes a semiconductor laser.

Alternatively, the erbium-doped fiber amplifier for amplifying signal light comprises: an optical fiber doped with erbium ions, the optical fiber being pumped by 0.98 µm band light and 1.48 µm band light and amplifying the signal light; a first pump light source for producing the 0.98 µm band light; a first optical coupler for receiving the 0.98 µm band light from the first pump light source, and coupling the 0.98 µm band light with the signal light; a second pump light source for producing the 1.48 µm band light; and a second optical coupler for receiving the 1.48 µm band light from the second pump light source, and coupling the 1.48 µm band light with the signal light, wherein an emission cross section of the optical fiber at 1.48 µm band is sufficiently smaller than an absorption cross section at the 1.48 µm band so that the 1.48 µm band light will not be amplified.

In one embodiment, the first pump light source includes a semiconductor laser.

In another embodiment, the second pump light source includes a semiconductor laser.

Alternatively, the erbium-doped fiber amplifier for amplifying signal light comprises: an optical fiber doped with erbium ions, the optical fiber being pumped by 0.98 µm band light and 1.48 µm band light and amplifying the signal light; a first pump light source for producing the 0.98 µm band light; a first optical coupler for receiving the 0.98 µm band light from the first pump light source, and coupling the 0.98 µm band light with the signal light; a second pump light source for producing the 1.48 µm band light; and a second optical coupler for receiving the 1.48 µm band light from the second pump light source, and coupling the 1.48 µm band light with the signal light, wherein the 1.48 µm band light has a wavelength of a level where the 1.48 µm band light will not be amplified in the optical fiber.

In one embodiment, the first pump light source includes a semiconductor laser.

In another embodiment, the second pump light source includes a semiconductor laser.

According to another aspect of the present invention, an optical fiber communication system is provided, which comprises: a light source for producing 1.55 µm band light as signal light; a first optical fiber doped with erbium ions and having an input portion and an output portion, the first optical fiber being pumped by 0.98 µm band light and amplifying the signal light; a first pump light source for producing the 0.98 µm band light; a first optical coupler for receiving the 0.98 µm band light from the first pump light source, and coupling the 0.98 µm band light with the signal light at the input portion of the first optical fiber; a second optical fiber doped with erbium ions and having an input portion and an output portion, the second optical fiber being pumped by 1.48 µm band light and amplifying the signal light; a second pump light source for producing the 1.48 µm band light; and a second optical coupler for receiving the 1.48 µm band light from the second pump light source, and coupling the 1.48 µm band light with the signal light at the output portion of the second optical fiber; wherein a pump light isolator is installed between the output portion of the first optical fiber and the input portion of the second optical fiber, and the pump light isolator blocks the passing of the 1.48 µm band light from the input portion of the second optical fiber to the output portion of the first optical fiber so that the 1.48 µm band light be smaller than the signal light in the first optical fiber, while the pump light isolator allows the passing of the signal light from the output portion of the first optical fiber to the input portion of the second optical fiber.

In one embodiment, the pump light isolator includes an optical filter.

In another embodiment, the pump light isolator includes an optical fiber-grating.

In another embodiment, the pump light isolator includes an optical isolator.

In another embodiment, the first pump light source includes a semiconductor laser.

In another embodiment, the second pump light source includes a semiconductor laser.

Alternatively, the optical fiber communication system comprises: a light source for producing 1.55 µm band light as signal light; an optical fiber doped with erbium ions, the optical fiber being pumped by 0.98 µm band light and 1.48 µm band light and amplifying the signal light; a first pump light source for producing the 0.98 µm band light; a first optical coupler for receiving the 0.98 µm band light from the first pump light source, and coupling the 0.98 µm band light with the signal; a second pump light source for producing the 1.48 µm band light; and a second optical coupler for receiving the 1.48 µm band light from the second pump light source, and coupling the 1.48 µm band light with the signal light, wherein an emission cross section of the optical fiber in the 1.48 µm band is sufficiently smaller than an absorption cross section at the 1.48 µm band so that the 1.48 µm band light will not be amplified.

In one embodiment, the first pump light source includes a semiconductor laser.

In another embodiment, the second pump light source includes a semiconductor laser.

Alternatively, the optical fiber communication system comprises: a light source for producing 1.55 µm band light as signal light; an optical fiber doped with erbium ions, the optical fiber being pumped by 0.98 μm band light and 1.48 μm band light and amplifying the signal light; a first pump light source for producing the 0.98 μm band light; a first optical coupler for receiving the 0.98 μm band light from the first pump light source, and coupling the 0.98 μm band light with the signal light; a second pump light source for producing the 1.48 μm band light; and a second optical coupler for receiving the 1.48 μm band light from the second pump light source, and coupling the 1.48 μm band light with the signal light, wherein the 1.48 μm band light has a wavelength of a level where the 1.48 μm band light will not be amplified.

In one embodiment, the first pump light source includes a semiconductor laser.

In another embodiment, the second pump light source includes a semiconductor laser.

According to the present invention, the 0.98 μm/1.48 μm band hybrid pumped fiber amplifier is provided with a pump light isolator. With this configuration, 1.48 μm pump light is prevented from being amplified by 0.98 μm band light. As a result, the NF can be decreased even at a high-output operation.

Thus, the invention described herein makes possible the advantages of (1) providing a fiber amplifier with high output power and low NF properties, and (2) providing a light signal transmission system with enhanced capabilities of long-distance transmission and multi-distribution.

These and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
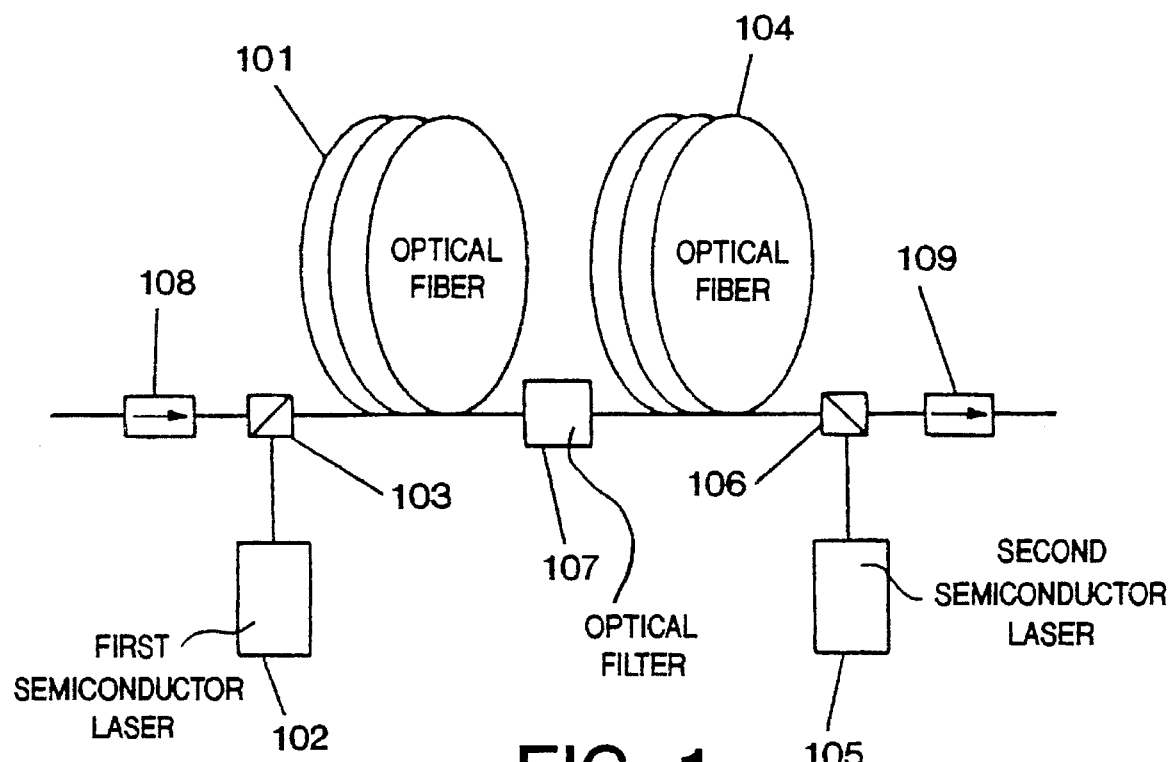
FIG. 1 shows a configuration of a first example of the fiber amplifier according to the present invention.

FIG. 1 shows a configuration of a first example of the fiber amplifier according to the present invention. An erbium-doped optical fiber 101 is connected with a first pump semiconductor laser 102 for emitting 0.98 μm band light through an optical coupler 103 for coupling 0.98 μm band pump light and 1.55 μm band signal light. Another erbium-doped optical fiber 104 is connected with a second pump semiconductor laser 105 for emitting 1.48 μm band light through an optical coupler 106 for coupling 1.48 μm band pump light and 1.55 μm band signal light. An optical filter 107 as a pump light isolator is installed between the optical fibers 101 and 104. With the optical filter 107, the 1.48 μm band pump light is substantially prevented from entering the optical fiber 101, so that the 1.48 μm band pump light is prevented from being amplified by the 0.98 μm band pump light. The filter 107 should be sufficiently transparent for the 1.55 μm band signal light. In this example, a dielectric multilayer film with low insertion loss is used. Optical isolators 108 and 109 are provided to prevent the fiber amplifier from oscillating through obtaining a high gain.

Figure 2:
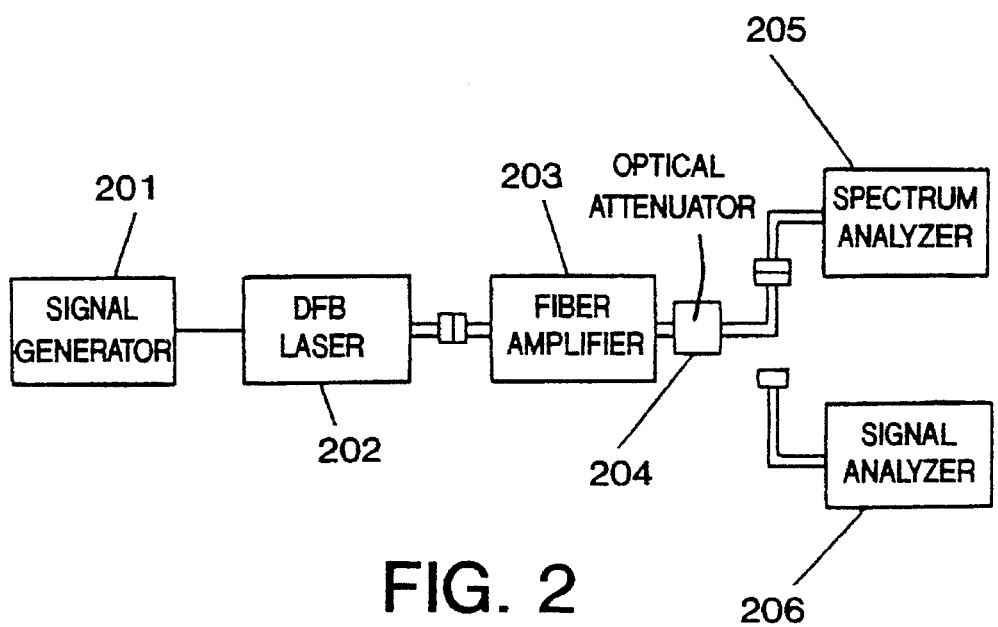
FIG. 2 shows a configuration of a system for evaluating the output power and NF properties of a fiber amplifier.

FIG. 2 shows a system for evaluating the output power and NF properties of the 0.98 μm/1.48 μm band pumped fiber amplifier.

Light output from a DFB laser 202 as a signal source is amplified by a fiber amplifier 203 and then attenuated by an optical attenuator 204. An optical spectrum analyzer 205 is used for the measurement of the output power in order to eliminate the influence of ASE. The NF is measured by an electrical evaluation method which can provide a highly precise measurement even at a high-input operation. The method includes modulating the intensity of the DFB laser 202 by an optical signal generator 201 and introducing the output light to an optical signal analyzer 206 so as to calculate the degradation of CNR between the input light and the output light to obtain the NF of the fiber amplifier.

The output power and NF of the fiber amplifier were measured under the conditions of the 0.98 μm band pump light power of 50 mW, the 1.48 μm band pump light power of 150 mW, and the input signal power of 1 dBm. The product of the length of an optical fiber and the concentration of erbium ions in the optical fiber (hereinafter, referred to as the concentration/length product) was used in this evaluation. The sum of the concentration/length product of the optical fiber 101 and the concentration/length product of the optical fiber 104 was fixed to 10 Kppm·m. The optical filter 107 produces losses of 50 dB, 30 dB, and 0.3 dB for 0.98 μm band light, 1.48 μm band light, and 1.55 μm band signal light, respectively.

Figure 3A:
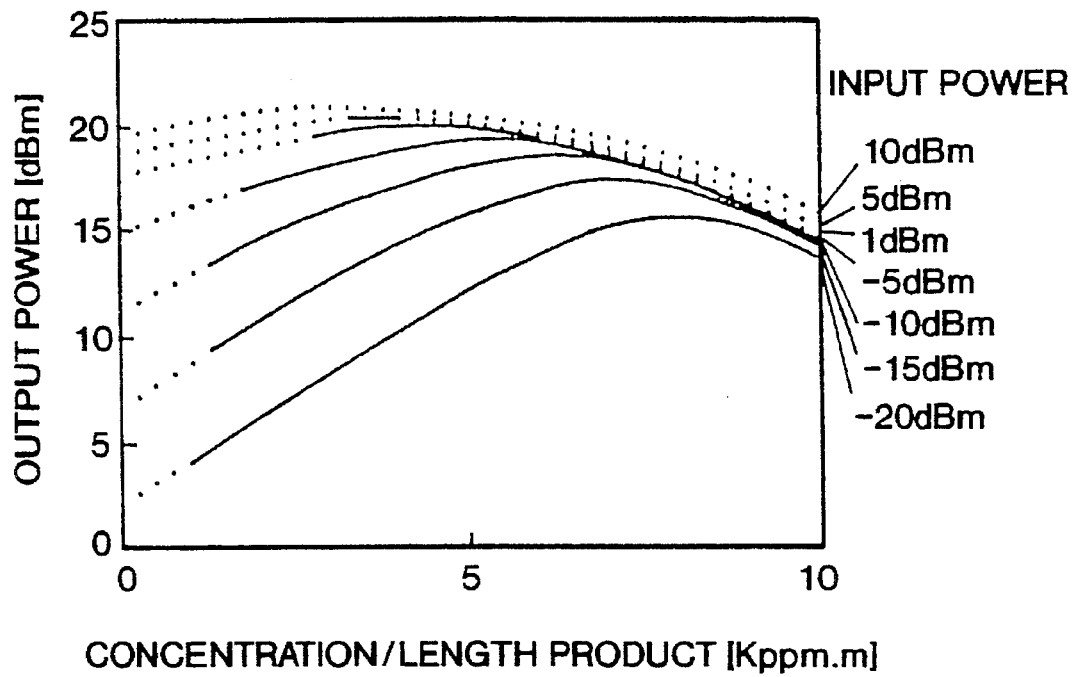
FIGS. 3A and 3B show the output power and NF properties as functions of the concentration/length product of an optical fiber, respectively, with the input power as a parameter changing in the range of −20 dBm to 10 dBm, under the conditions of the sum of the concentration/length products of optical fibers of 10 Kppm·m, each of 0.98 μm/1.48 μm band pump light powers of 100 mW, and the wavelength of signal light of 1.551 μm.
Figure 14A:
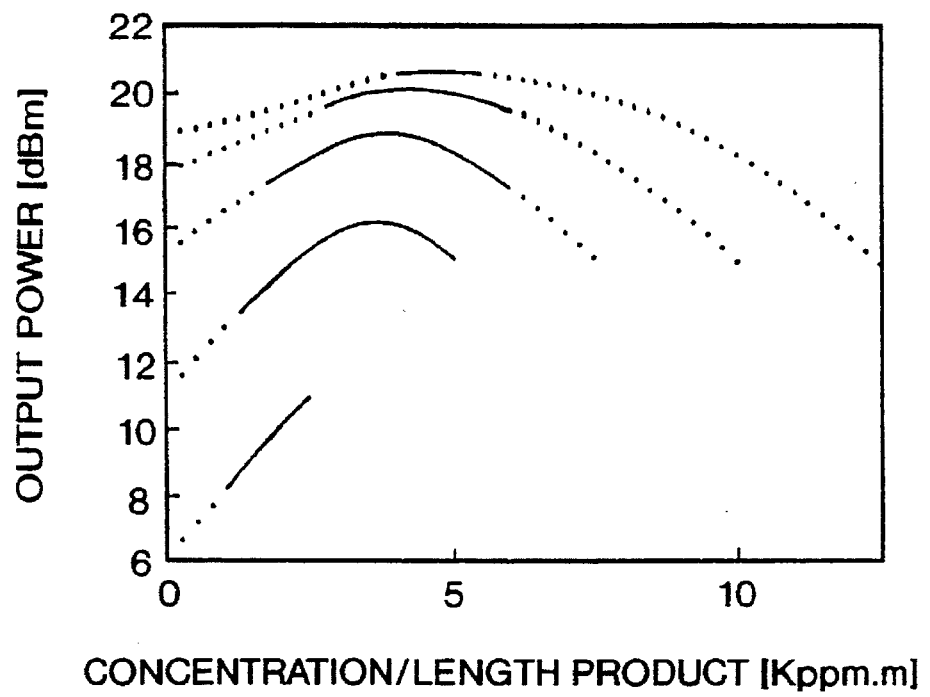
FIGS. 14A and 14B show the output power and NF properties as functions of the concentration/length product of an optical fiber, respectively, with the sum of the concentration/length products as a parameters changing in the range of 2.5 Kppm·m to 12.5 Kppm·m, under the conditions of each of 0.98 μm/1.48 μm pump band light powers of 100 mW, the input light power of 1 dBm, and the wavelength of signal light of 1.551 μm.
Figure 14B:
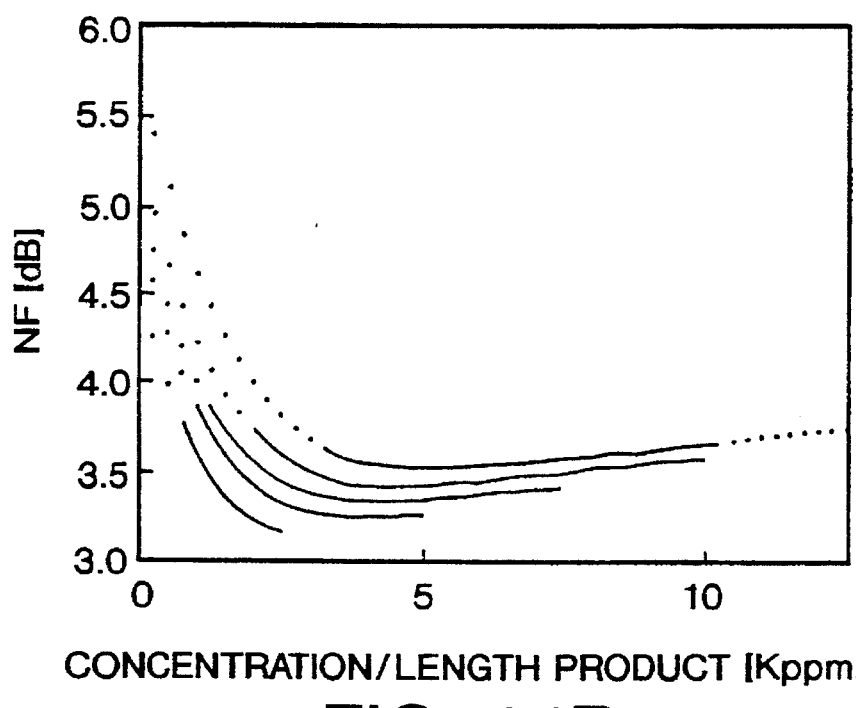

FIGS. 3A and 14B show the results obtained by this evaluation using the system of FIG. 2. In these figures, the solid lines show the range of the concentration/length product of the optical fiber 101 where the properties can be improved by the provision of the optical filter 107.

Figure 3B:
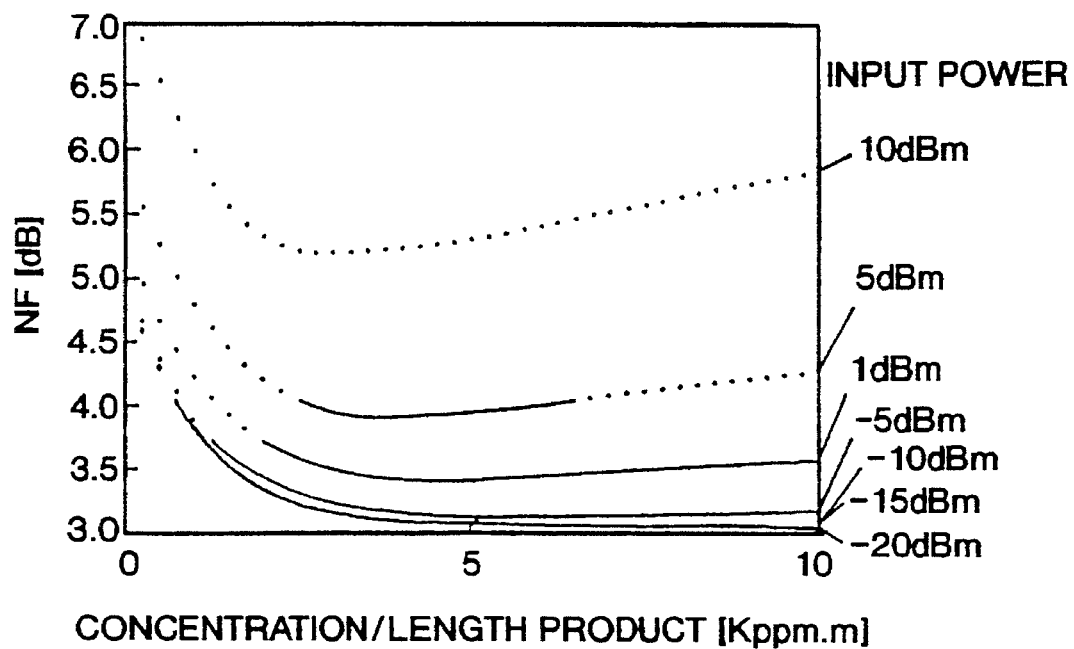

FIGS. 3A and 3B show the output power and NF properties as functions of the concentration/length product of the optical fiber 101, respectively, with the input power as a parameter changing in the range of −20 dBm to 10 dBm. From these figures, it is found that the value of the concentration/length product which is optimal both for the output power and NF can be obtained when the concentration/length product of the optical fiber 101 is varied with the sum of the concentration/length products of the optical fibers 101 and 104 kept fixed. Under the input power of 1 dBm, a high output power of 20 dBm and a low NF of 3.4 dB are obtained when the concentration/length product of the optical fiber 101 is 4.4 Kppm·m.

A fiber amplifier having the same configuration of FIG. 1 except that no optical filter was installed between the optical fibers 101 and 104 was also evaluated under the same conditions. In this case, the output power was 18.5 dBm and the NF was 3.8 dB. The above results indicate that the output power and NF properties can be improved by providing the optical filter as far as the concentration/length product of the optical fiber 101 is in the range shown by the solid lines. This range of the concentration/length product where the properties can be improved by the provision of the optical filter is wider as the input power is smaller as shown in FIGS. 3A and 3B.

Figure 4A:
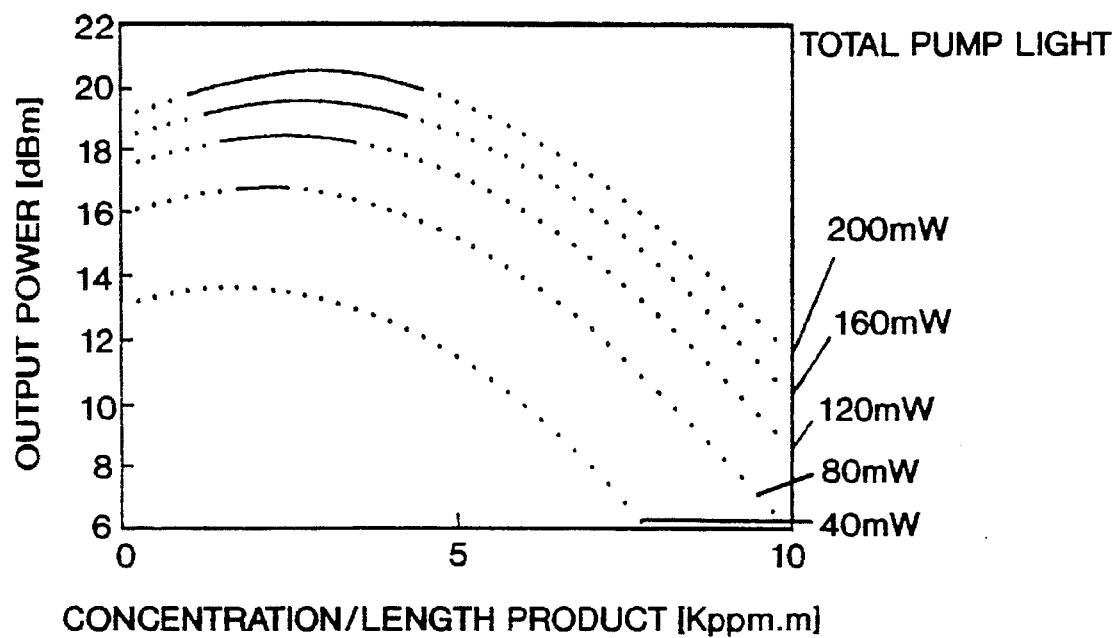
FIGS. 4A and 4B show the output power and NF properties as functions of the concentration/length product of an optical fiber, respectively, with the total 0.98 μm/1.48 μm band light powers as a parameter changing in the range of 40 mW to 200 mW, under the conditions of the sum of the concentration/length products of 10 Kppm·m, the ratio of the 0.98 μm/1.48 μm band light powers of 3:1, the input light power of 1 dBm, and the wavelength of signal light of 1.551 μm.
Figure 4B:
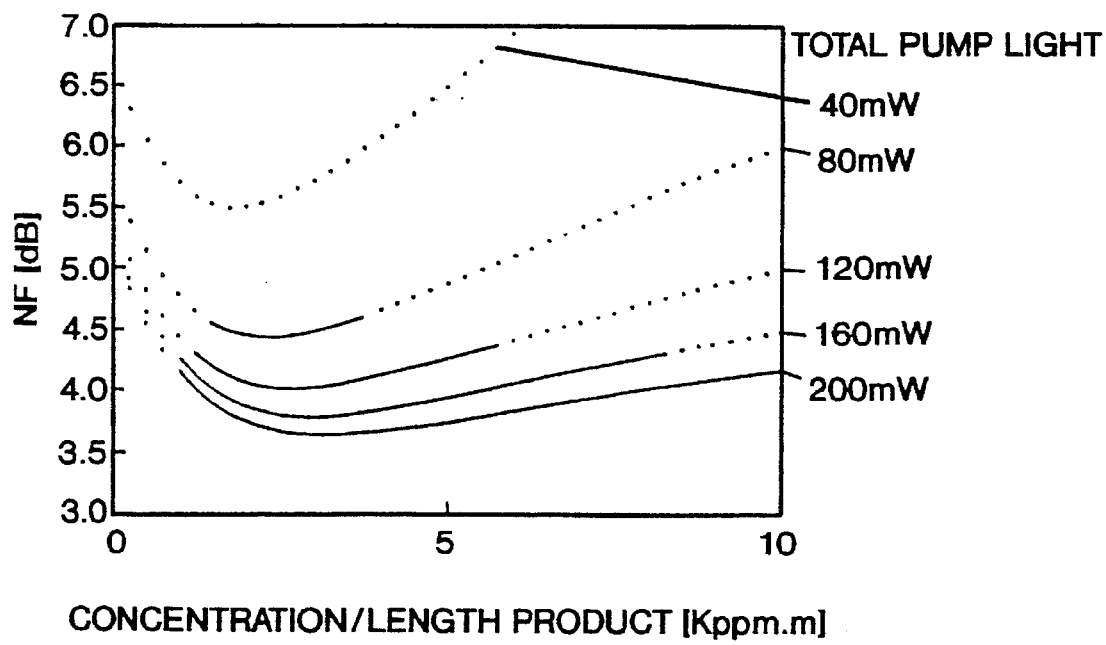
Figure 5A:
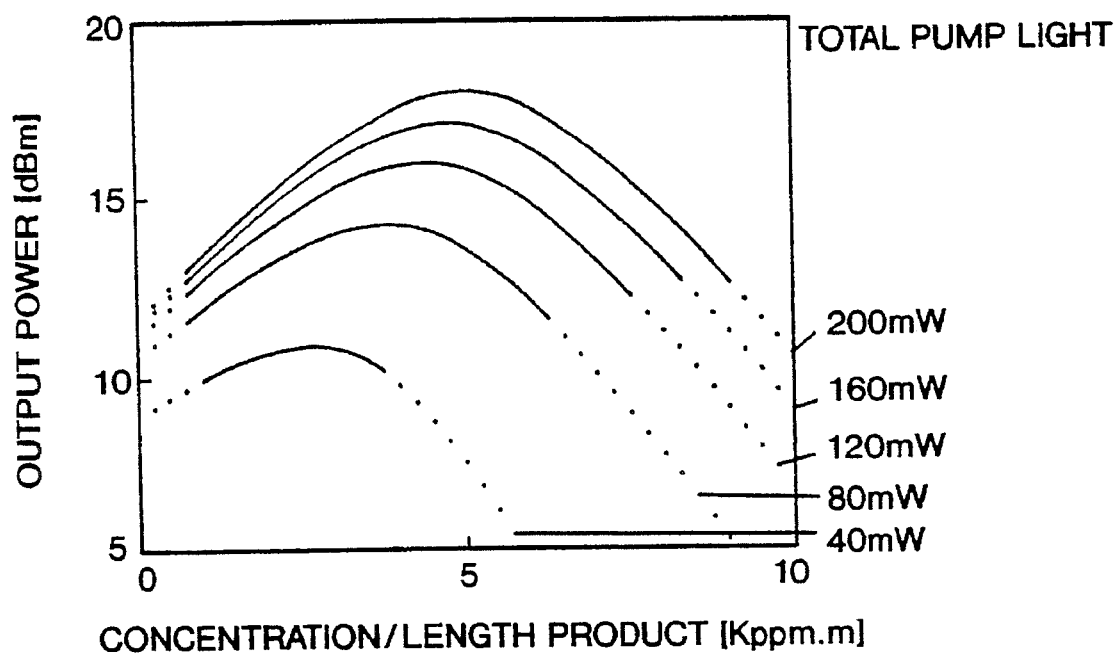
FIGS. 5A and 5B show the output power and NF properties as functions of the concentration/length product of an optical fiber, respectively, with the total 0.98 μm/1.48 μm band light powers as a parameter changing in the range of 40 mW to 200 mW, under the conditions of the sum of the concentration/length products of 10 Kppm·m, the ratio of the 0.98 μm/1.48 μm band light powers of 3:1, the input light power of −10 dBm, and the wavelength of signal light of 1.551 pm.
Figure 5B:
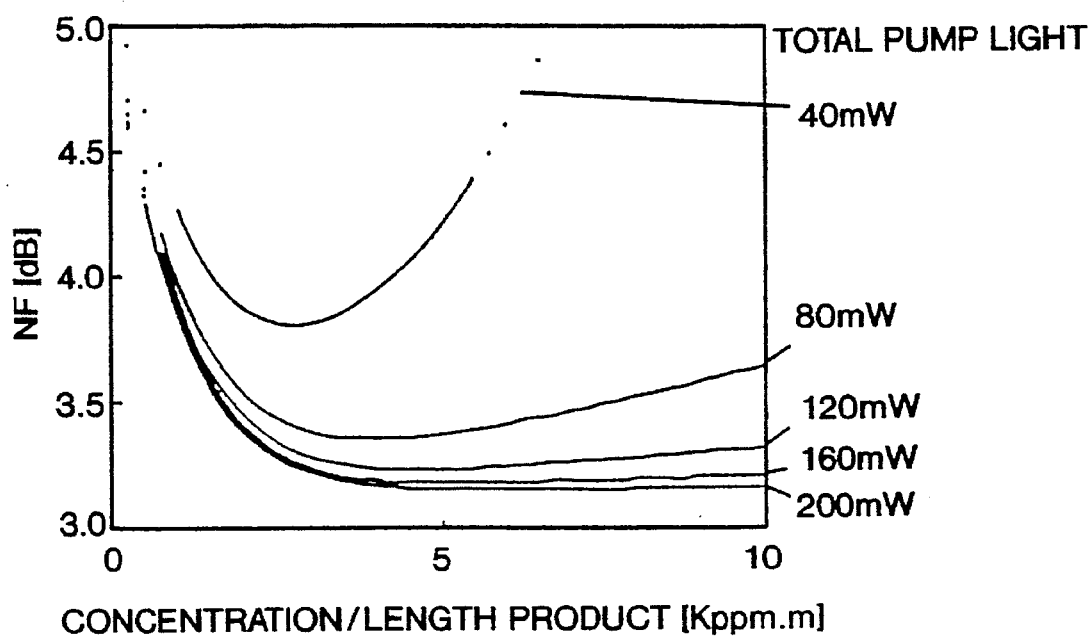
Figure 6A:
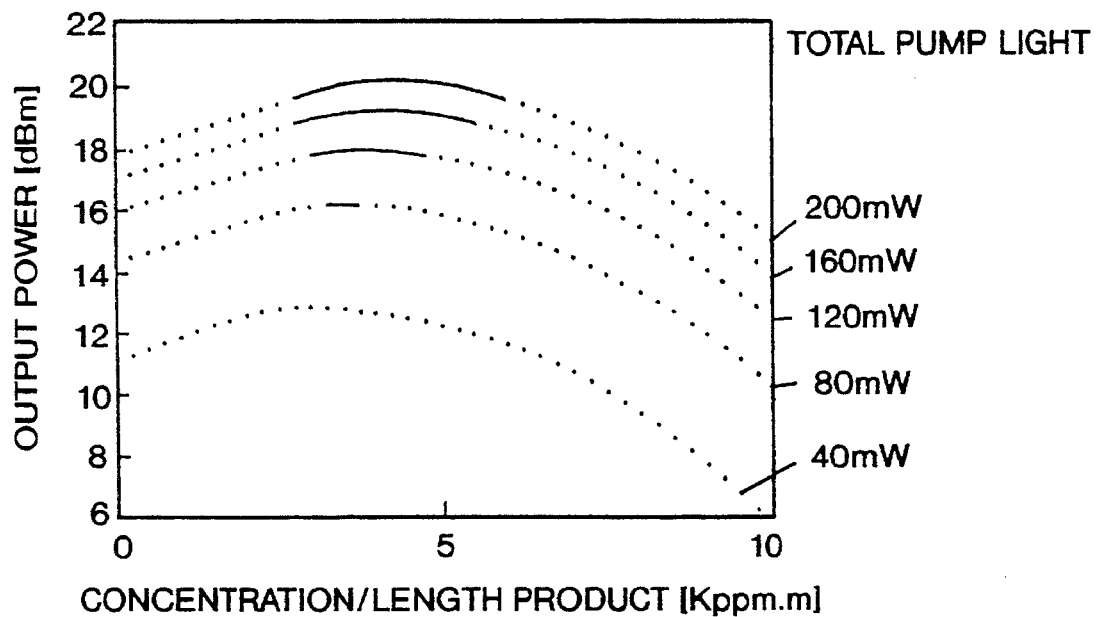
FIGS. 6A and 6B show the output power and NF properties as functions of the concentration/length product of an optical fiber, respectively, with the total 0.98 μm/1.48 μm band light powers as a parameter changing in the range of 40 mW to 200 mW, under the conditions of the sum of the concentration/length products of 10 Kppm·m, the ratio of the 0.98 μm/1.48 μm band light powers of 1:1, the input light power of 1 dBm, and the wavelength of signal light of 1.551 μm.
Figure 6B:
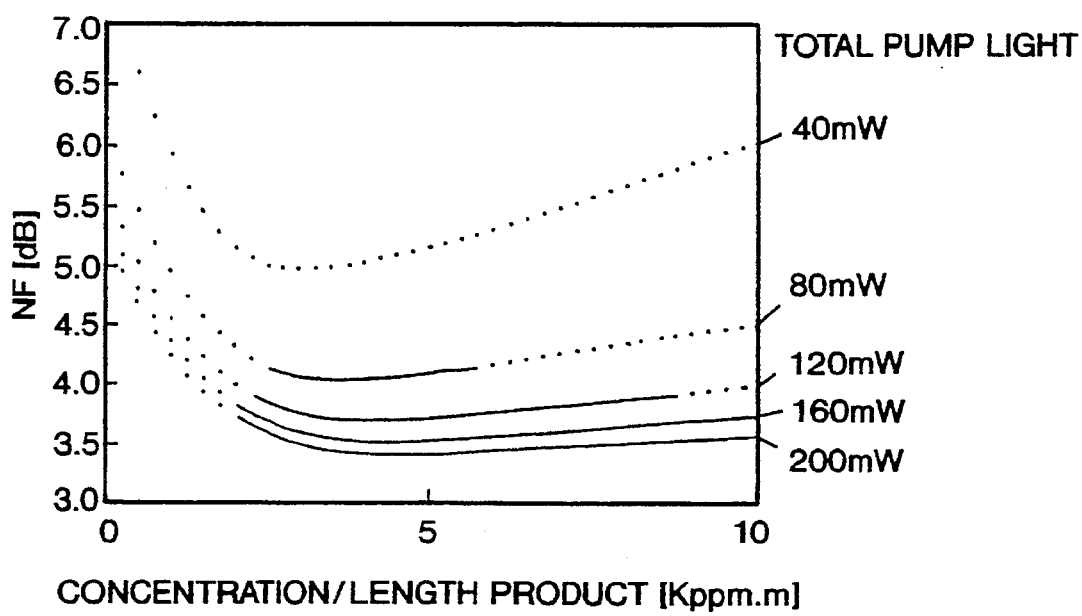
Figure 7A:
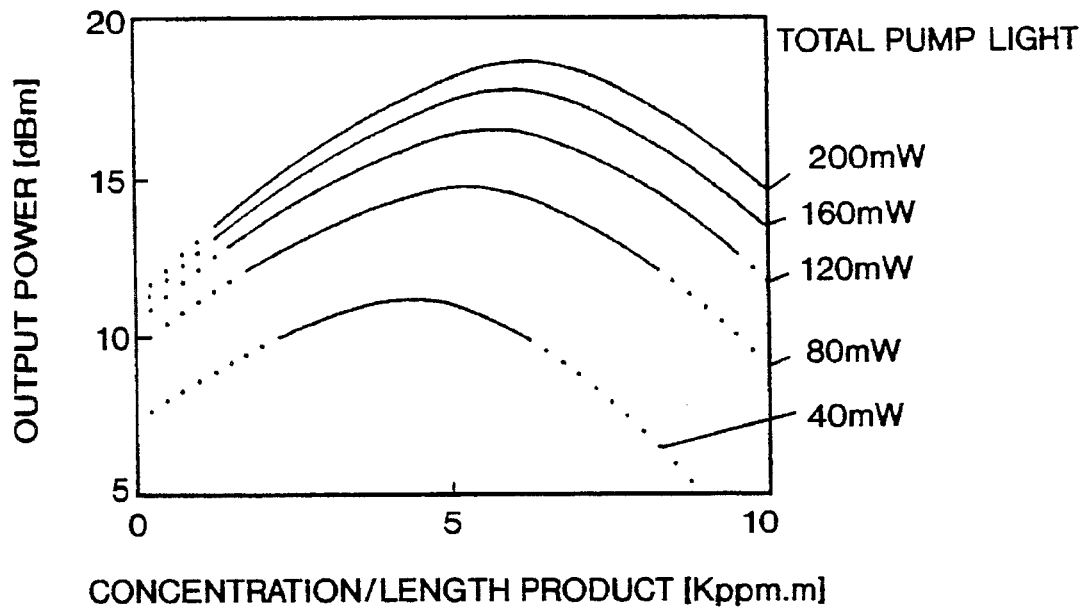
FIGS. 7A and 7B show the output power and NF properties as functions of the concentration/length product of an optical fiber, respectively, with the total 0.98 μm/1.48 μm band light powers as a parameter changing in the range of 40 mW to 200 mW, under the conditions of the sum of the concentration/length products of 10 Kppm·m, the ratio of the 0.98 μ/1.48 μband light powers of 1:1, the input light power of −10 dBm, and the wavelength of signal light of 1.551 μm.
Figure 7B:
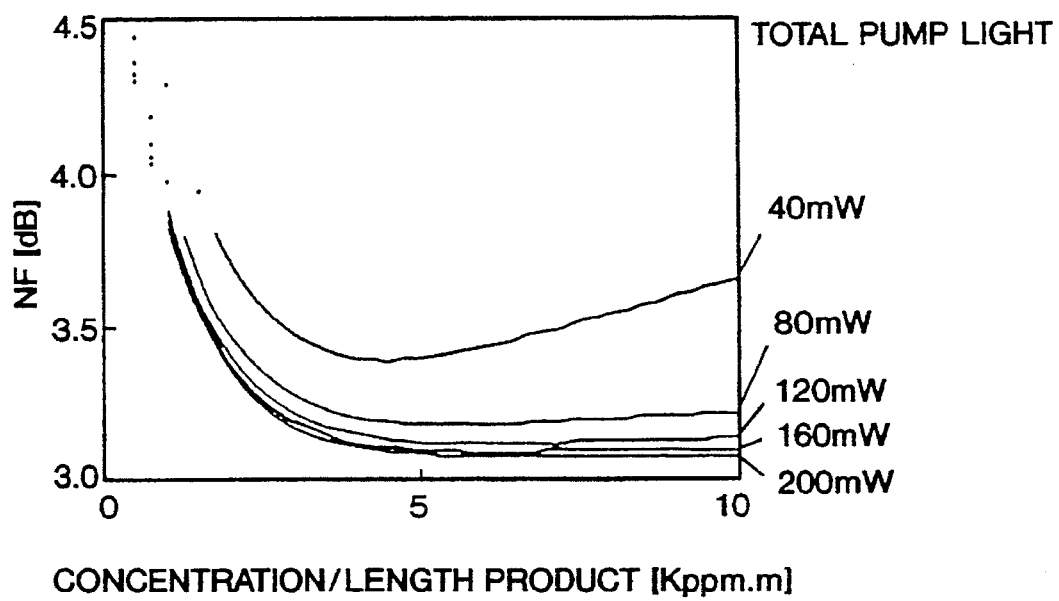
Figure 8A:
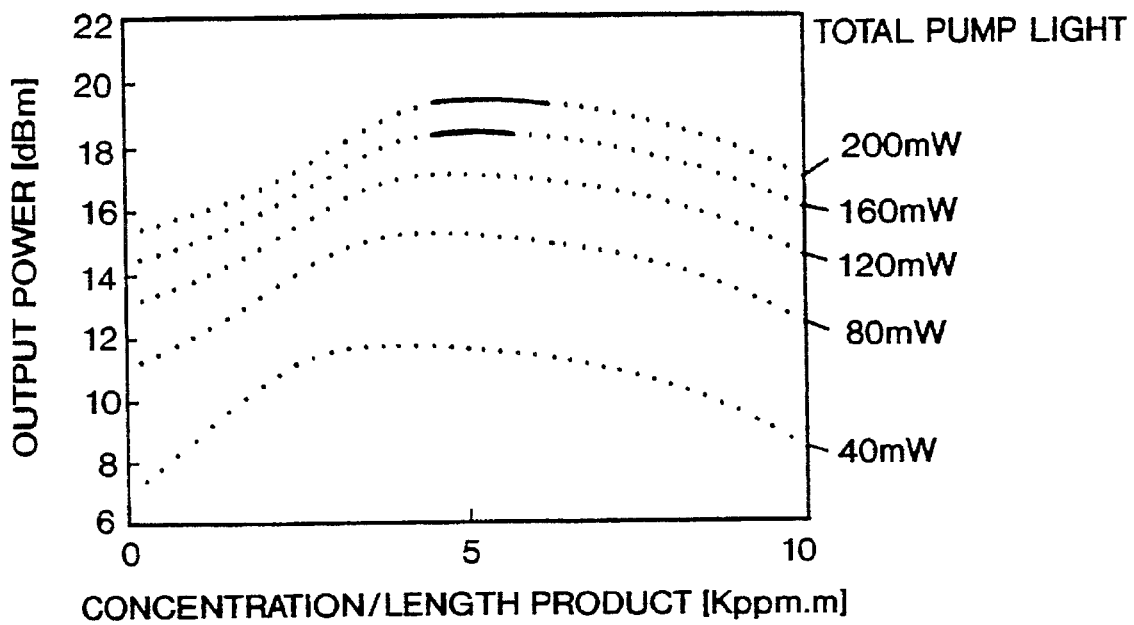
FIGS. 8A and 8B show the output power and NF properties as functions of the concentration/length product of an optical fiber, respectively, with the total 0.98 μm/1.48 μm band light powers as a parameter changing in the range of 40 mW to 200 mW, under the conditions of the sum of the concentration/length products of 10 Kppm·m, the ratio of the 0.98 μm/1.48 μm band light powers of 1:3, the input light power of 1 dBm, and the wavelength of signal light of 1.551 μm.
Figure 8B:
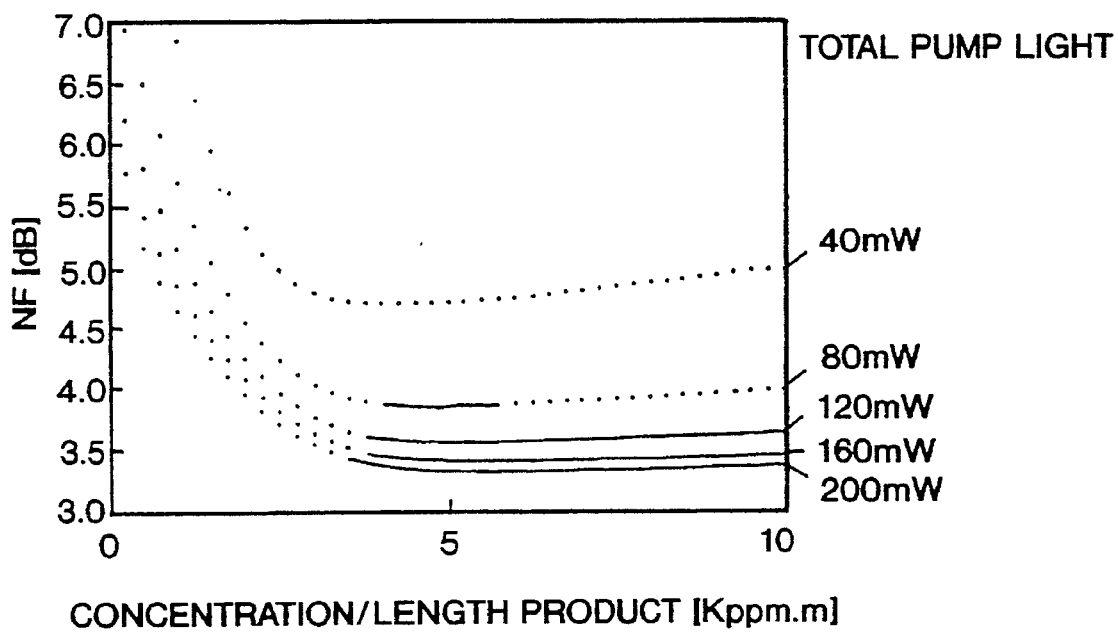
Figure 9A:
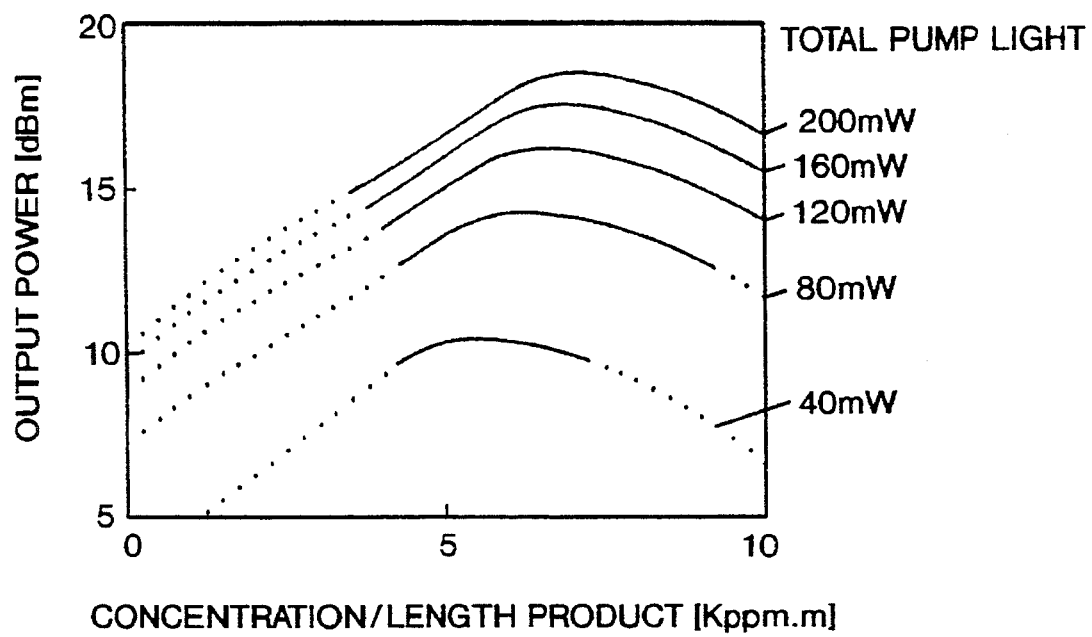
FIGS. 9A and 9B show the output power and NF properties as functions of the concentration/length product of an optical fiber, respectively, with the total 0.98 μm/1.48 μm band light powers as a parameter changing in the range of 40 mW to 200 mW, under the conditions of the sum of the concentration/length products of 10 Kppm·m, the ratio of the 0.98 μm/1.48 μm band light powers of 1:3, the input light power of −10 dBm, and the wavelength of signal light of 1.551 μm.
Figure 9B:
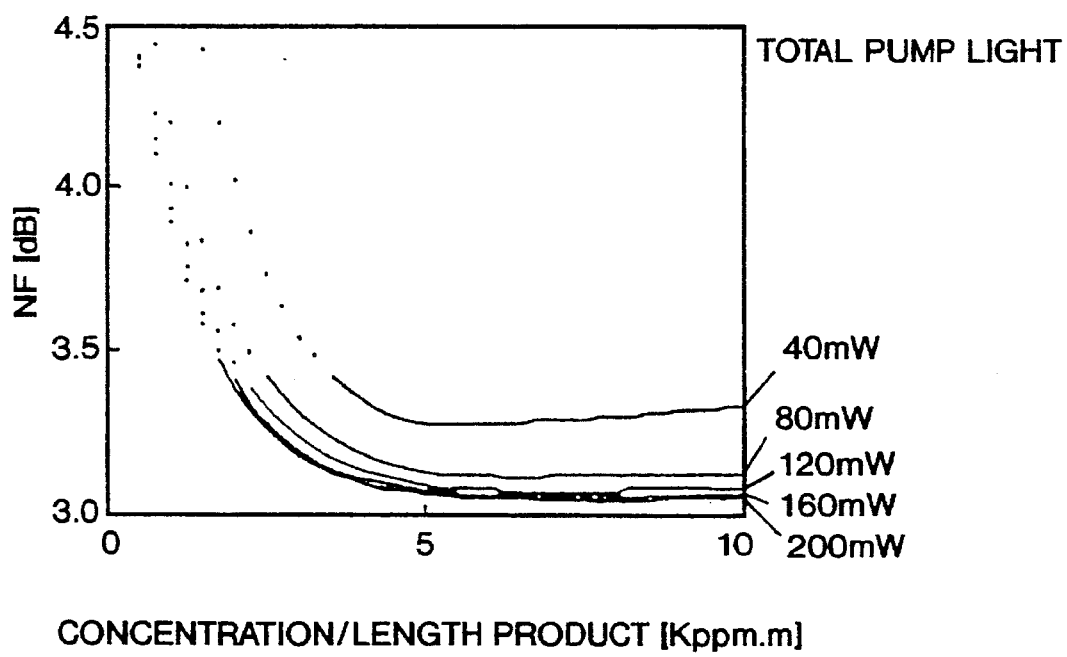

FIGS. 4A and 9B show the output power and NF properties as functions of the concentration/length product of the optical fiber 101, respectively, with the total pump light power as a parameter changing in the range of 40 mW to 200 mW. The sum of the concentration/length products of the optical fibers 101 and 104 is fixed to 10 Kppm·m. FIGS. 4A and 4B show the output power and NF, respectively, when the ratio of 0.98 μm/1.48 μm band pump light powers is 3:1 and the input light power is 1 dBm. FIGS. 5A and 5B show the output power and NF, respectively, when the ratio of 0.98 μm/1.48 μm band pump light powers is 3:1 and the input light power is −10 dBm. FIGS. 6A and 6B show the output power and NF, respectively, when the ratio of 0.98 μm/1.48 μm band pump light powers is 1:1 and the input light power is 1 dBm. FIGS. 7A and 7B show the output power and NF, respectively, when the ratio of 0.98 μm/1.48 μm band pump light powers is 1:1 and the input light power is −10 dBm. FIGS. 8A and 8B show the output power and NF, respectively, when the ratio of 0.98 μm/1.48 μm band pump light powers is 1:3 and the input light power is 1 dBm. FIGS. 9A and 9B show the output power and NF, respectively, when the ratio of 0.98 μm/1.48 μm band light powers is 1:3 and the input light power is −10 dBm.

From these figures, it is found that the output power and NF properties can be improved by providing the optical filter. The variation in the optimum concentration/length product of the optical fiber 101 corresponding to the change in the total power of pump light is as small as 10% or less. Therefore, the properties of the fiber amplifier will not be lowered if the fiber amplifier is adjusted under automatic power control (APC) at the time of installing the optical filter.

Figure 10A:
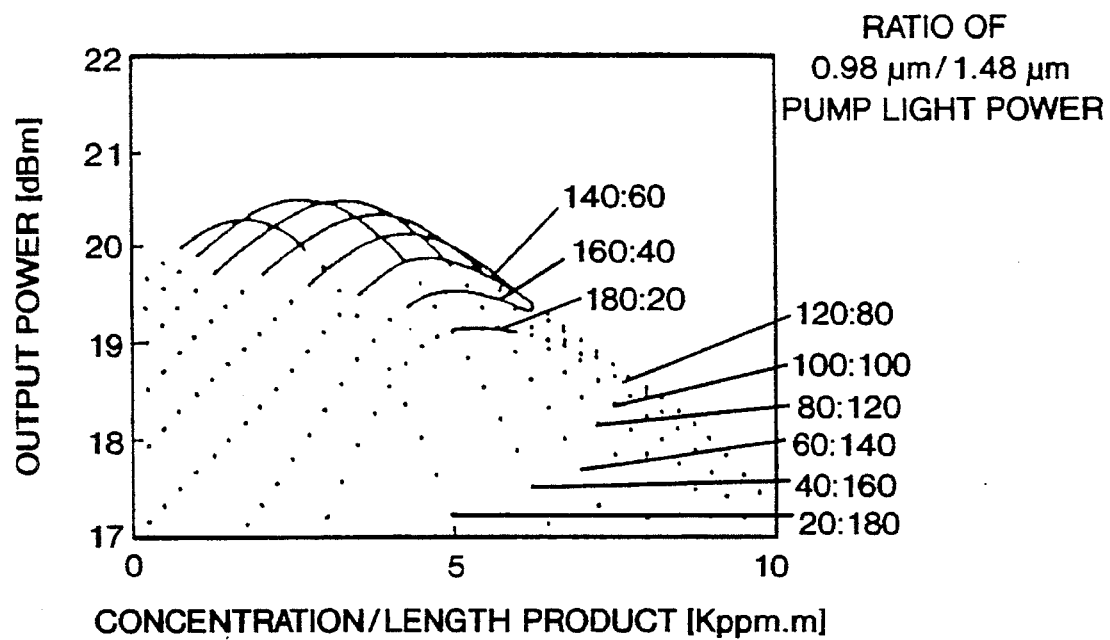
FIGS. 10A and 10B show the output power and NF properties as functions of the concentration/length product of an optical fiber, respectively, with the ratio of 0.98 μm/1.48 μm band light powers as a parameter changing in the range of 20 mW:180 mW to 180 mW:20 mW, under the conditions of the sum of the concentration/length products of 10 Kppm·m, the total 0.98 μm/1.48 μm band light powers of 200 mW, the input light power of 1 dBm, and the wavelength of signal light of 1.551 μm.
Figure 10B:
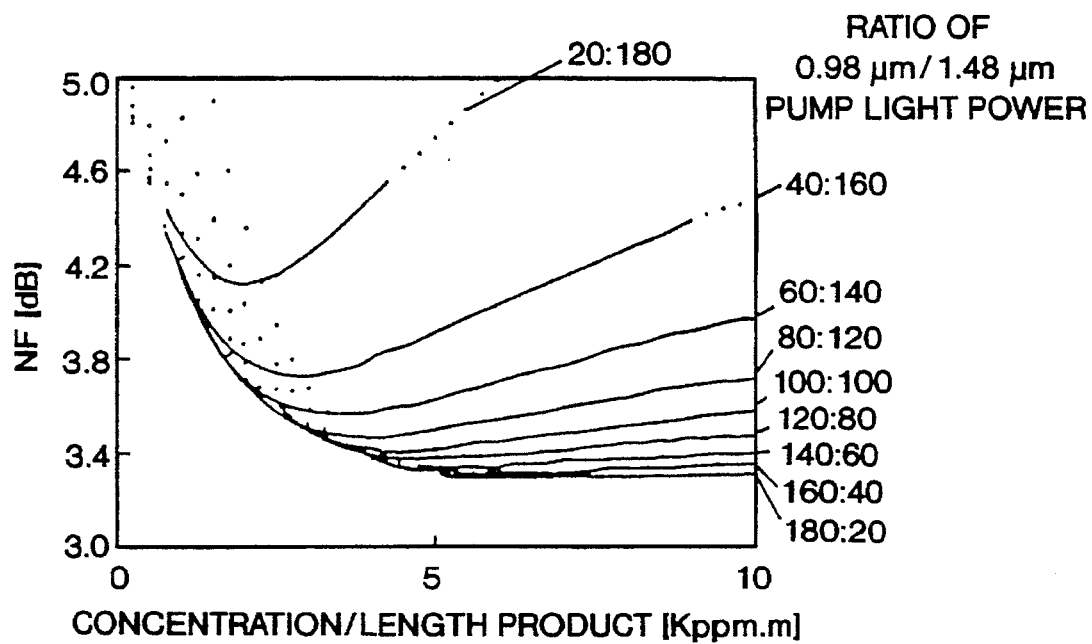
Figure 11A:
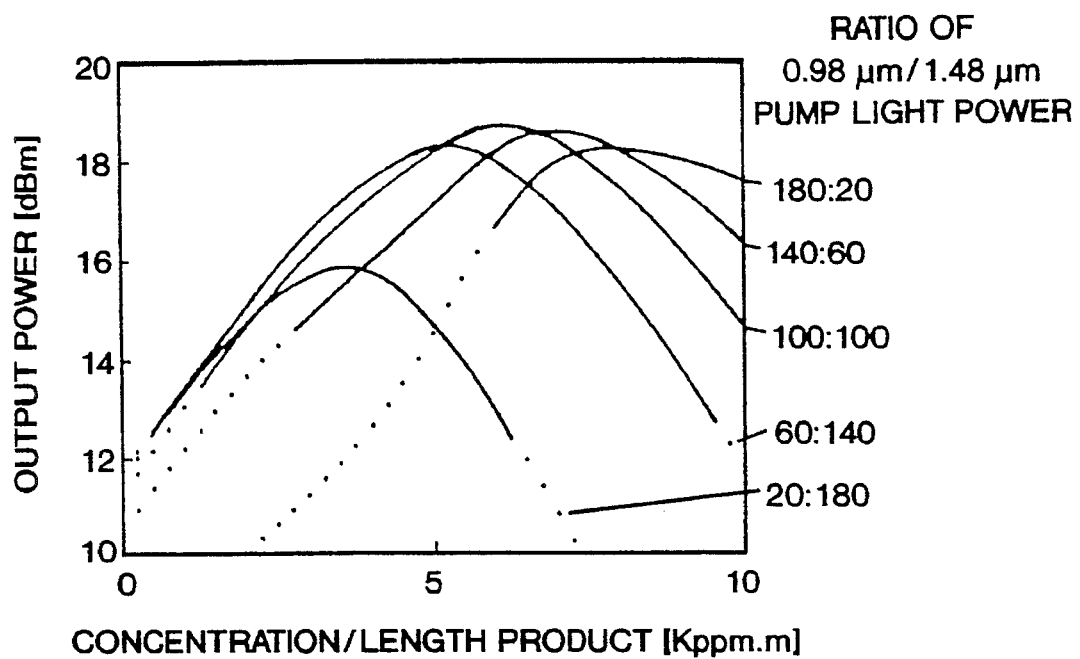
FIGS. 11A and 11B show the output power and NF properties as functions of the concentration/length product of an optical fiber, respectively, with the ratio of 0.98 μm/1.48 μm band light powers as a parameter changing in the range of 20 mW:180 mW to 180 mW:20 mW, under the conditions of the sum of the concentration/length products of 10 Kppm·m, the total 0.98 μm/1.48 μm band light powers of 200 mW, the input light power of −10 dBm, and the wavelength of signal light of 1.551 μm.
Figure 11B:
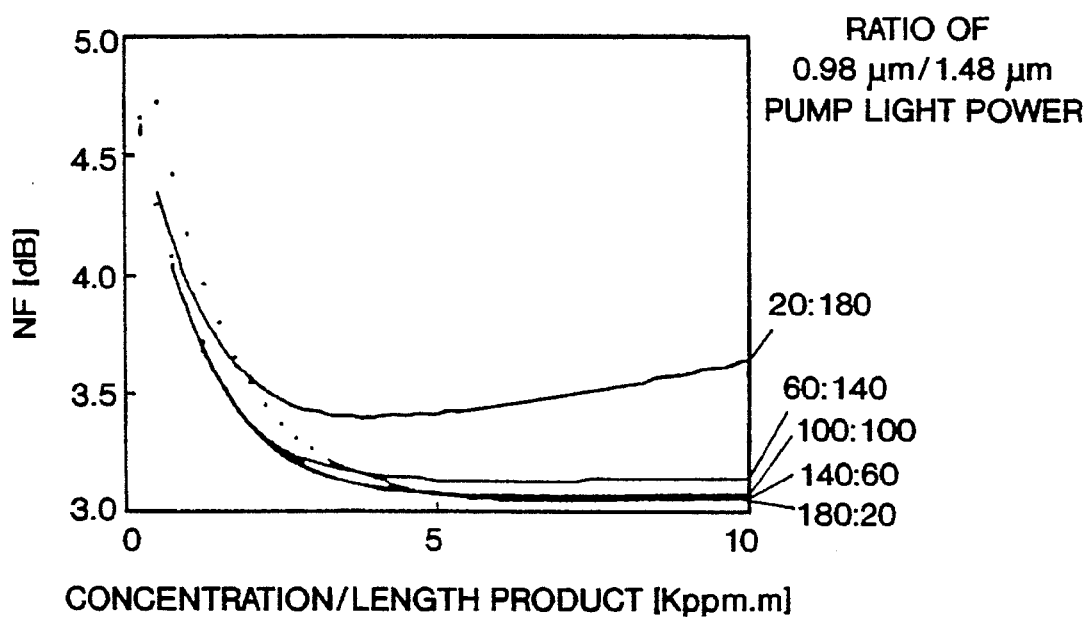
Figure 12A:
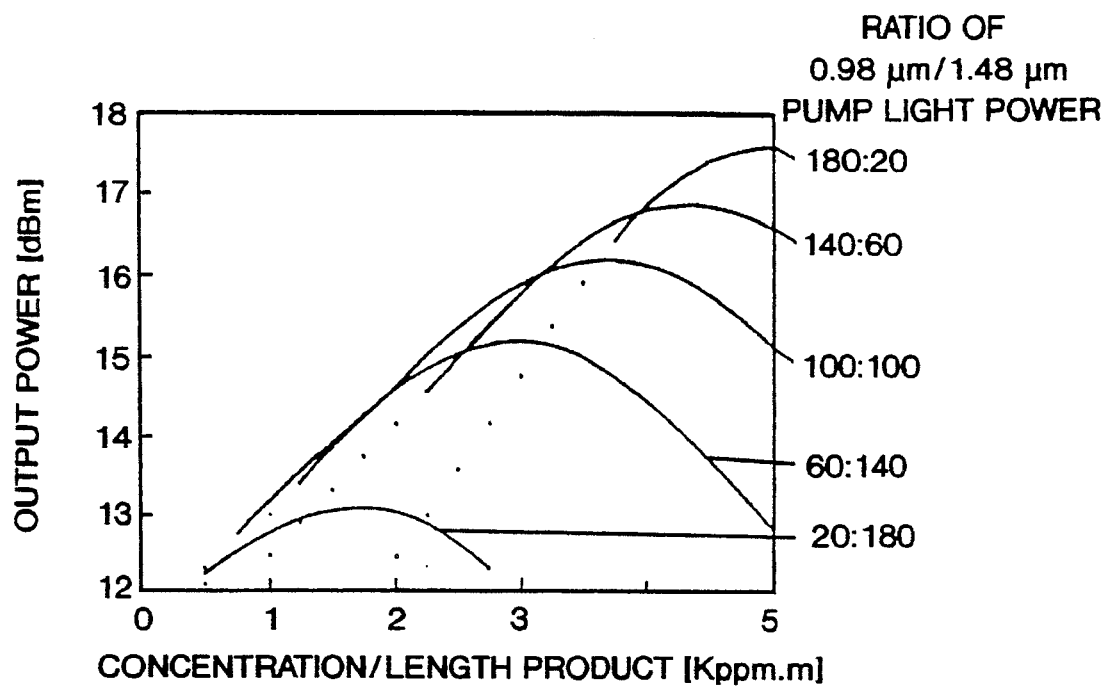
FIGS. 12A and 12B show the output power and NF properties as functions of the concentration/length product of an optical fiber, respectively, with the ratio of 0.98 μm/1.48 μm band light powers as a parameter changing in the range of 20 mW:180 mW to 180 mW:20 mW, under the conditions of the sum of the concentration/length products of 5 Kppm·m, the total 0.98 μm/1.48 μm band light powers of 200 mW, the input light power of 1 dBm, and the wavelength of signal light of 1.551 μm.
Figure 12B:
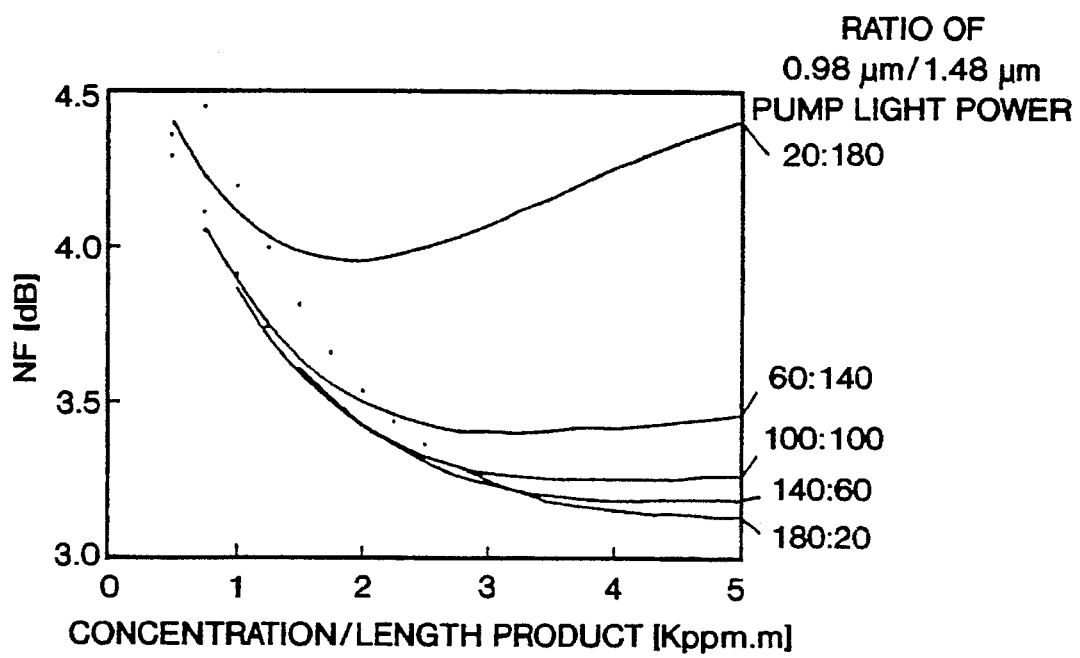
Figure 13A:
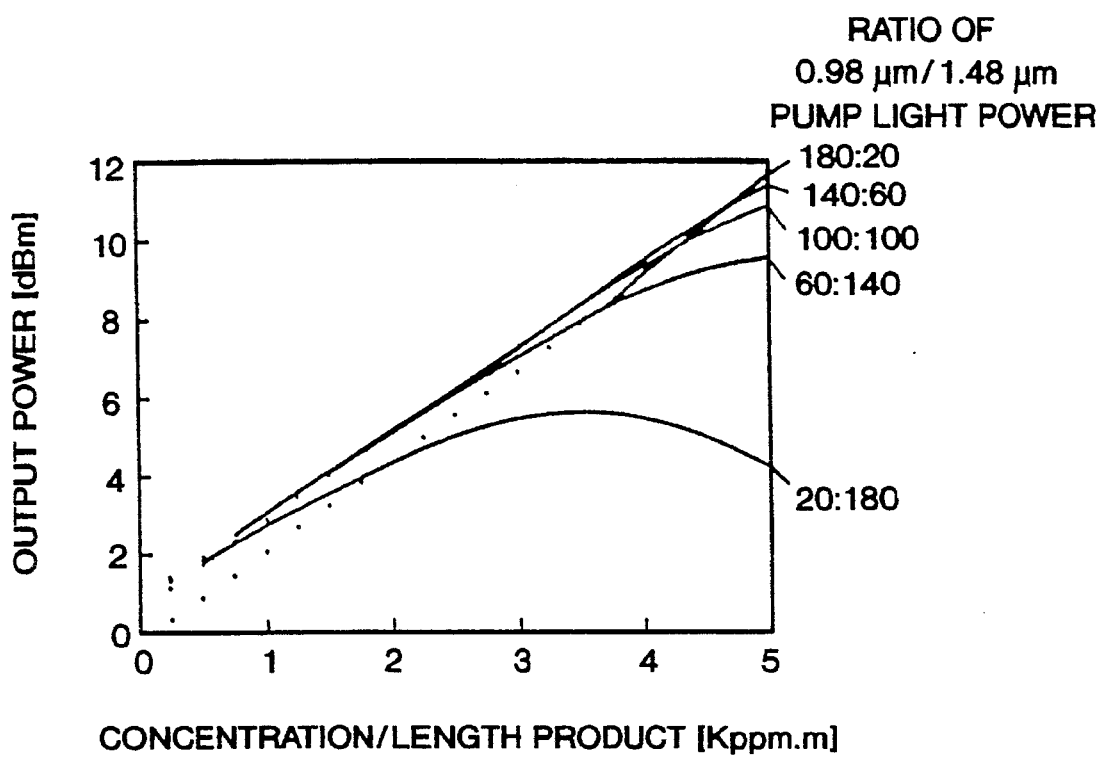
FIGS. 13A and 13B show the output power and NF properties as functions of the concentration/length product of an optical fiber, respectively, with the ratio of 0.98 μm/1.48 μm band light powers as a parameter changing in the range of 20 mW:180 mW to 180 mW:20 mW, under the conditions of the sum of the concentration/length products of 5 Kppm·m, the total 0.98 μm/1.48 μm band light powers of 200 mW, the input light power of −10 dBm, and the wavelength of signal light of 1.551 μm.
Figure 13B:
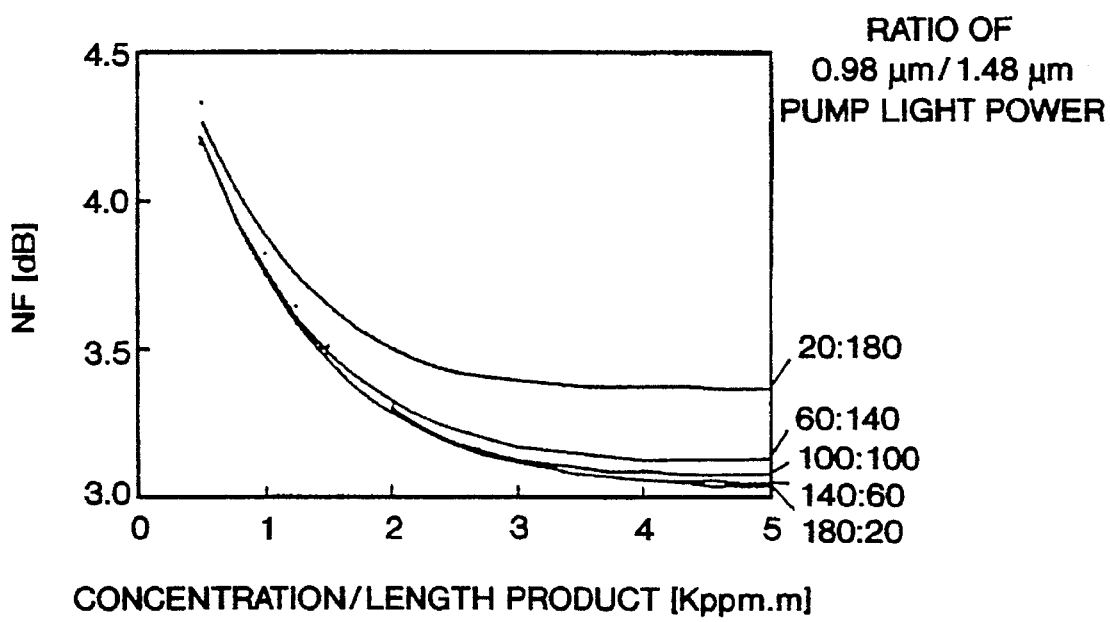

FIGS. 10A and 13B show the output power and NF properties as functions of the concentration/length product of the optical fiber 101, respectively, with the 0.98 μm/1.48 μm band pump light powers changing in the ranges of 20 mW to 180 mW and 180 mW to 20 mW, respectively. The total pump light power is fixed to 200 mW. FIGS. 10A and 10B show the output power and NF, respectively, when the sum of the concentration/length product of the optical fibers 101 and 104 is 10 Kppm·m and the input light power is 1 dBm. FIGS. 11A and 11B show the output power and NF, respectively, when the sum of the concentration/length product of the optical fibers 101 and 104 is 10 Kppm·m and the input light power is −10 dBm. FIGS. 12A and 12B show the output power and NF, respectively, when the sum of the concentration/length product of the optical fibers 101 and 104 is 5 Kppm·m and the input light power is 1 dBm. FIGS. 13A and 13B show the output power and NF, respectively, when the sum of the concentration/length product of the optical fibers 101 and 104 is 5 Kppm·m and the input light power is −10 dBm. From these figures, it is found that the output power and NF properties can be improved by providing the optical filter. It is also found that the optimum concentration/length product of the optical fiber 101 for the output power and NF varies corresponding to the change in the ratio of the pump light powers. However, since the optimum value for the output power and that for NF are always the same, it is easy to adjust an error of the concentration/length product of the optical fibers produced at the time of manufacturing the fiber amplifier by varying the ratio of pump light powers.

FIGS. 14A and 14B show the output power and NF properties as functions of the concentration/length product of the optical fiber 101, respectively, when the sum of the concentration/length products of the optical fibers 101 and 104 is changed in the range of 2.5 Kppm·m to 12.5 Kppm·m. The 0.98 μm/1.48 μm band pump light powers are respectively fixed to 100 mW. From these figures, it is found that the output power and NF properties can be improved by providing the optical filter.

As described above, it was observed that the output power and NF properties of the 0.98 μm/1.48 μm band pumped fiber amplifier were improved by installing the optical filter as a pump light isolator between the erbium-doped optical fibers. This is possible by the following two effects: the NF property at the high pump wavelength is improved by preventing the 1.48 μm band pump light from being amplified by the 0.98 μm band pump light; the fiber amplifier has the configuration where signal light, not the 1.48 μm band pump light, is amplified by the 0.98 μm band pump light having a high differential gain, so that a high output power is obtained as the entire fiber amplifier. Thus, with this configuration, the low NF property at 0.98 μm band pumping and the high output power property at 1.48 μm band pumping can be obtained simultaneously.

Example 2

Figure 15:
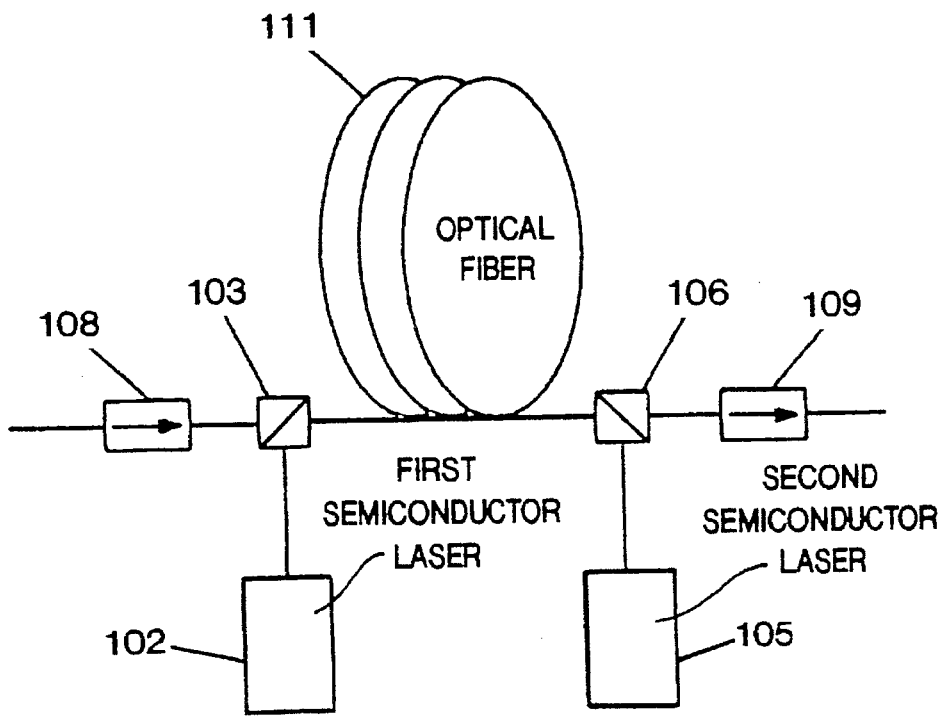
FIG. 15 shows a second example of the fiber amplifier according to the present invention.

FIG. 15 shows a configuration of a second example of the fiber amplifier according to the present invention. An erbium-doped optical fiber 111 is connected with a first pump semiconductor laser 102 for emitting 0.98 μm band light through an optical coupler 103 for coupling 0.98 μm band pump light and 1.55 μm band signal light. The erbium-doped optical fiber 111 is also connected with a second pump semiconductor laser 105 for emitting 1.48 μm band light through an optical coupler 106 for coupling 1.48 μm band pump light and 1.55 μm band signal light. Optical isolators 108 and 109 are provided to prevent the fiber amplifier from oscillating through obtaining a high gain.

Equation (1) shows the condition where the 1.48 μm band pump light is prevented from being amplified at points in the erbium-doped optical fiber.

$$\frac{\sigma_{p2}^e \cdot \sigma_{p1}^a}{\sigma_{p2}^a + \sigma_{p2}^e} \Gamma_{p1} \cdot \phi_{p1} + \frac{\sigma_{p2}^e \cdot \sigma_s^a - \sigma_{p2}^a \cdot \sigma_s^e}{\sigma_{p2}^a + \sigma_{p2}^e} \Gamma_s \cdot \phi_s \leq \frac{1}{\tau} \quad (1)$$

$$\phi_k = \frac{P_k}{\pi \cdot (A_k)^2 \cdot h \cdot \nu_k} \quad (k = p1, s) \quad (2)$$

wherein $\sigma^{a,e}_{p1,p2,s}$ denotes the absorption cross sections (a) and the emission cross sections (e) for 0.98 μm band pump light (p1), 1.48 μm band pump light (p2), and 1.55 μm band signal light (s), respectively. $\phi_{p1,s}$ denotes the photon densities represented by Equation (2) for the respective wavelengths. $\Gamma_{p1,s}$ denotes the confinement coefficients for the respective wavelengths. τ denotes the relaxation time for the signal light wavelength. $P_k$ denotes the light power for each wavelength, $A_k$ the mode field diameter at each wavelength, h the Planck's constant, and $\nu_k$ the oscillating frequency corresponding to each wavelength.

Equation (1) shows that, in order to prevent the 1.48 μm band pump light from being amplified by the 0.98 μm band pump light even when the light power of the latter is large, the absorption cross section at the 1.48 μm band light wavelength should be large while the emission cross section should be small, or the absorption cross section at the signal light wavelength should be small while the emission cross section should be large. Especially, when the emission cross section is sufficiently smaller than the absorption cross section in the 1.48 μm band, both the first term and the second term of Equation (1) are small. Thus, Equation (1) is satisfied.

Figure 16:
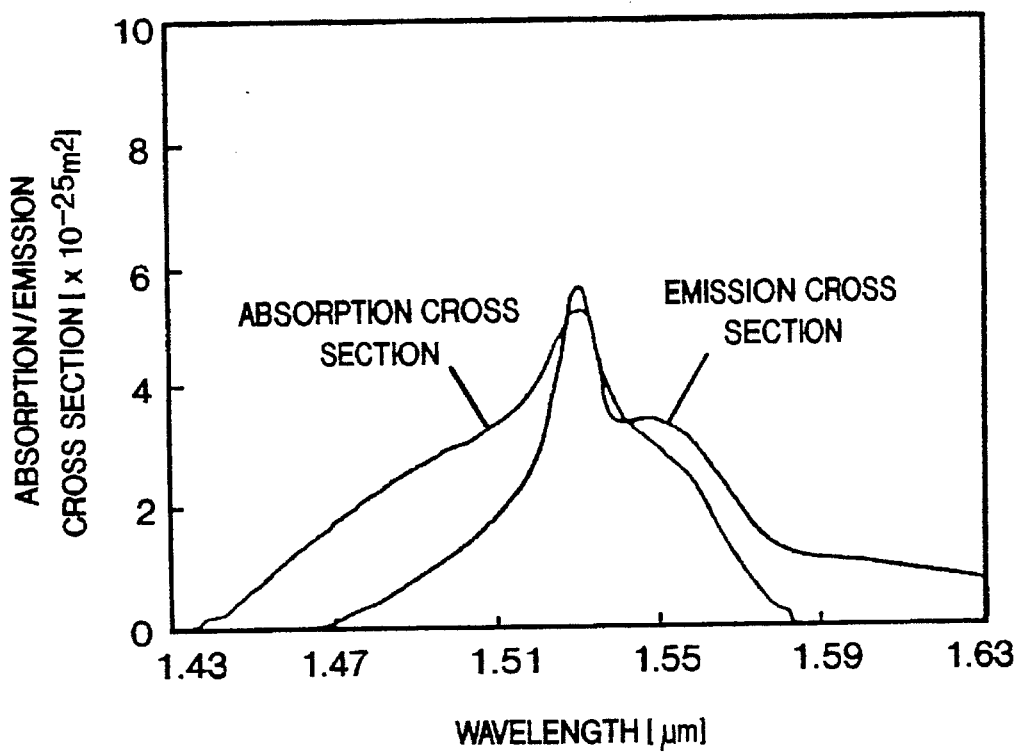
FIG. 16 shows wavelength dependency of the absorption cross section and the emission cross section.

The absorption cross section and the emission cross section of the optical fiber 111 have the wavelength dependency as shown in FIG. 16. Since the emission cross section is sufficiently smaller than the absorption cross section in the 1.48 μm band, Equation (1) is satisfied at this wavelength under the normal pump light power and signal light power. Thus, the NF property is prevented from being degraded.

Example 3

Figure 17:
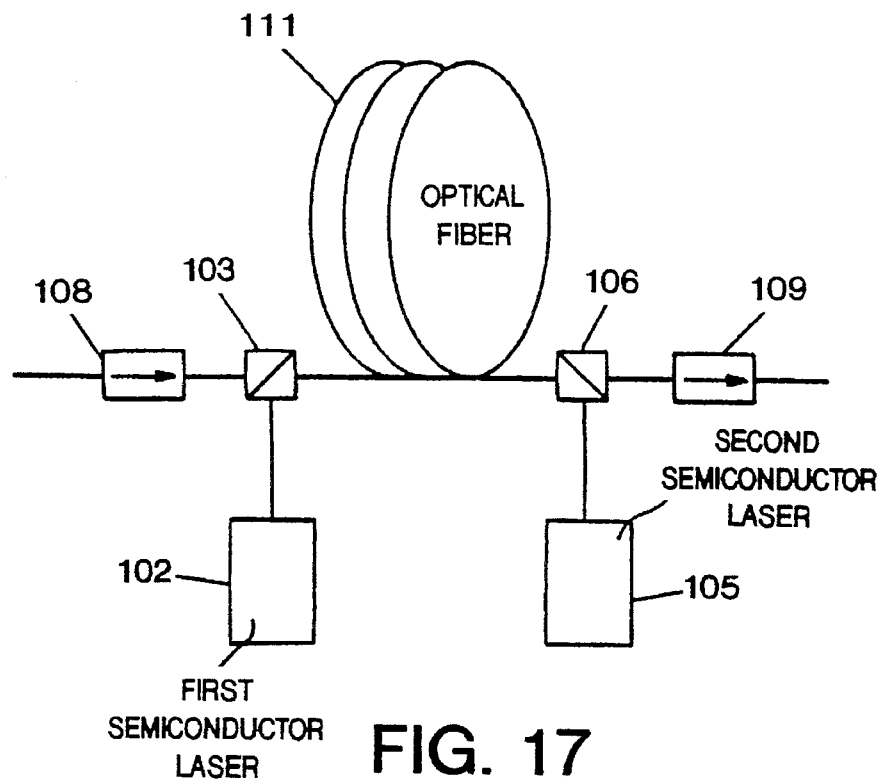
FIG. 17 shows a third example of the fiber amplifier according to the present invention.

FIG. 17 shows a configuration of a third example of the fiber amplifier according to the present invention. An erbium-doped optical fiber 111 is connected with a first pump semiconductor laser 102 for emitting 0.98 μm band light through an optical coupler 103 for coupling 0.98 μm band pump light and 1.55 μm band signal light. The erbium-doped optical fiber 111 is also connected with a second pump semiconductor laser 105 for emitting 1.47 μm band light through an optical coupler 106 for coupling 1.47 μm band pump light and 1.55 μm band signal light. Optical isolators 108 and 109 are provided to prevent the fiber amplifier from oscillating through obtaining a high gain.

The absorption cross section and the emission cross section of the optical fiber 111 have the wavelength dependency as shown in FIG. 16. Since the emission cross section is substantially zero in the 1.47 μm band, Equation (1) is satisfied at this wavelength, independent of the pump light power and signal light power. Thus, the NF property is prevented from being degraded.

Example 4

Figure 18:
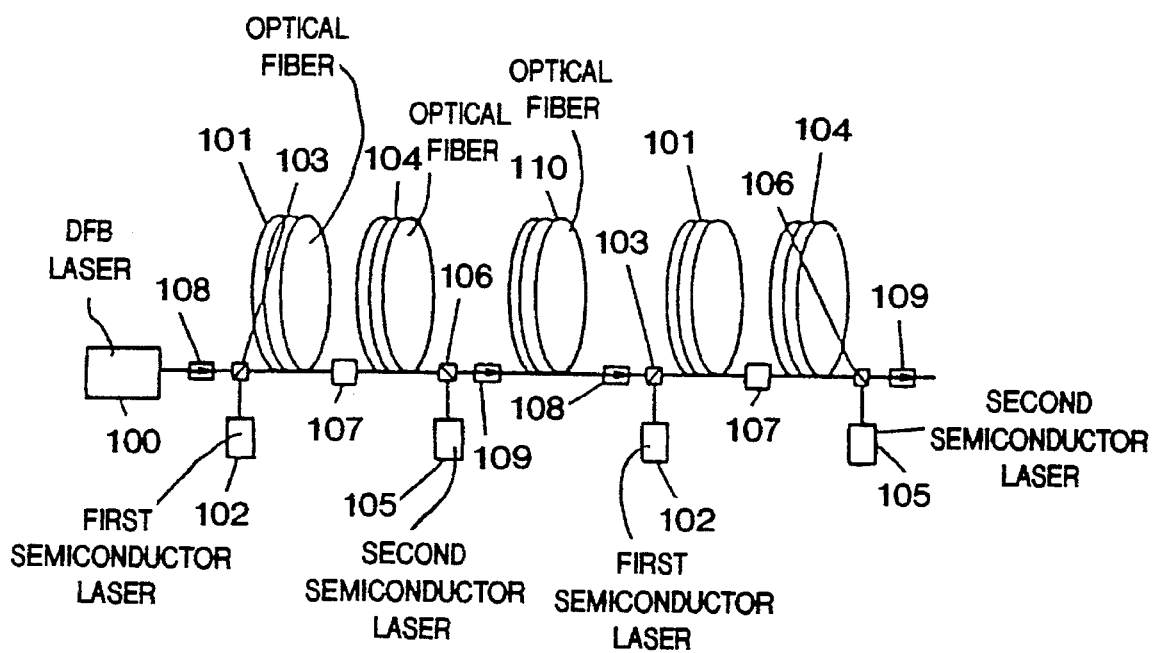
FIG. 18 shows a first example of the light signal transmission system according to the present invention.

FIG. 18 shows a configuration of a first example of the light signal transmission system according to the present invention. A DFB laser 100 as a signal light source oscillates at a wavelength of 1.551 μm. Each of erbium-doped optical fibers 101 is connected with a first pump semiconductor laser 102 for emitting 0.98 μm band light through an optical coupler 103 for coupling 0.98 μm band pump light and 1.55 μm band signal light. Each of erbium-doped optical fibers 104 is connected with a second pump semiconductor laser 105 for emitting 1.48 μm band light through an optical coupler 106 for coupling 1.48 μm band pump light and 1.55 μm band signal light. Optical filters 107 as a pump light isolator are respectively installed between the optical fibers 101 and 104. With the optical filters 107, the 1.48 μm band pump light is substantially prevented from entering the optical fibers 101, so that the 1.48 μm band pump light is prevented from being amplified by the 0.98 μm band pump light. The filter 107 should be sufficiently transparent for the 1.55 μm band signal light. In this example, a dielectric multilayer film with low insertion loss is used. Optical isolators 108 and 109 are provided to prevent the fiber amplifier from oscillating by obtaining a high gain. The system of this example also includes a single mode optical fiber 110.

Example 5

Figure 19:
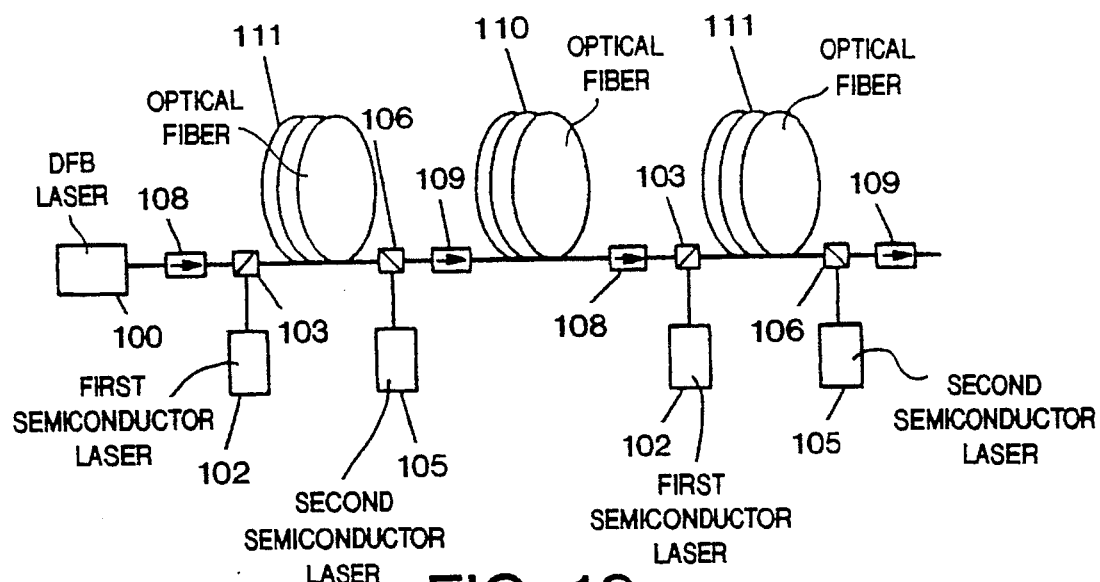
FIG. 19 shows a second example of the light signal transmission system according to the present invention.

FIG. 19 shows a configuration of a second example of the light signal transmission system according to the present invention. A DFB laser 100 as a signal light source oscillates at a wavelength of 1.551 μm. Each of erbium-doped optical fibers 111 is connected with a first pump semiconductor laser 102 for emitting 0.98 μm band light through an optical coupler 103 for coupling 0.98 μm band pump light and 1.55 μm band signal light. The erbium-doped optical fiber 111 is also connected with a second pump semiconductor laser 105 for emitting 1.48 μm band light through an optical coupler 106 for coupling 1.48 μm band pump light and 1.55 μm band signal light. Optical isolators 108 and 109 are provided to prevent the fiber amplifier from oscillating through obtaining a high gain. The fiber amplifier of this example also includes a single mode optical fiber 110.

The absorption cross section and the emission cross section of the optical fiber 111 have the wavelength dependency as shown in FIG. 16. Since the emission cross section is sufficiently smaller than the absorption cross section in the 1.48 μm band, Equation (1) is satisfied at this wavelength under the normal pump light power and signal light power. Thus, the NF property is prevented from being degraded.

Example 6

Figure 20:
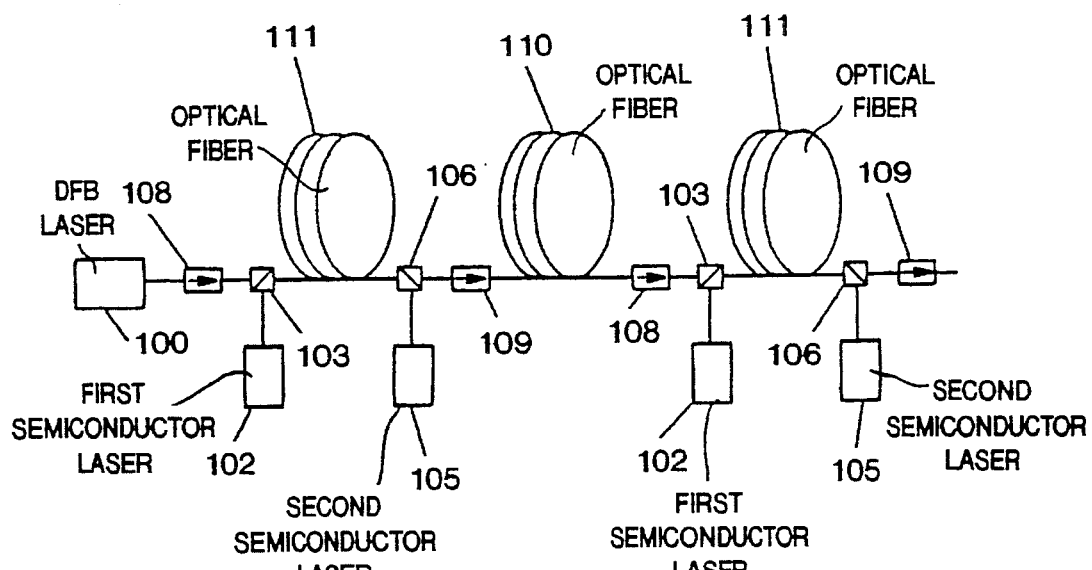
FIG. 20 shows a third example of the light signal transmission system according to the present invention.

FIG. 20 shows a configuration of a third example of the light signal transmission system according to the present invention. A DFB laser 100 as a signal source oscillates at a wavelength of 1.551 μm. Each of erbium-doped optical fibers 110 is connected with a first pump semiconductor laser 102 for emitting 0.98 μm band light through an optical coupler 103 for coupling 0.98 μm band pump light and 1.55 μm band signal light. The erbium-doped optical fiber 110 is also connected with a second pump semiconductor laser 105 for emitting 1.47 μm band light through an optical coupler 106 for coupling 1.47 μm band pump light and 1.55 μm band signal light. Optical isolators 108 and 109 are provided to prevent the fiber amplifier from oscillating through obtaining a high gain. The fiber amplifier of this example also includes a single mode optical fiber 110.

The absorption cross section and the emission cross section of the optical fiber 111 have the wavelength dependency as shown in FIG. 16. Since the emission cross section is substantially zero in the 1.47 μm band, Equation (1) is satisfied at this wavelength, independent of the pump light power and signal light power. Thus, the NF property is prevented from being degraded.

In the above examples, the optical filter of a dielectric multilayer film with low insertion loss was used. An etalon type optical filter and a grating type optical filter (e.g., an optical fiber grating) which have high wavelength selection property may be more effective in blocking the 1.48 μm band pump light. When an optical isolator is used, ASE can be eliminated, as well as the 1.48 μm band pump light can be prevented from being amplified.

In the above examples, the multi-mode pump light laser light having a wavelength of 1.48 μm was used as the 1.48 μm band pump light. The same effects can be obtained by using a single-mode laser or a multi-mode laser having an oscillation peak wavelength of about 1.49 μm or less where absorption is provided. In Examples 1 and 4, the same effects can be obtained when a pump light source having a broad oscillation spectrum such as an LED is used.

In the above examples, the optical fiber doped with erbium ions homogeneously throughout the length thereof was used. The same effects can be obtained when the optical fiber has a concentration profile gradient along the length thereof or it is composed of a plurality of portions with different concentrations which are connected to one another.

The 0.98 μm band pump light was incident forward to the erbium-doped optical fiber, while the 1.48 μm band pump light was incident backward to the erbium-doped optical fiber. However, in Examples 2, 3, 5, and 6, the same effects can be obtained when the 0.98 μm band pump light and the 1.48 μm band pump light are incident to the optical fiber in the same direction. In Examples 1 and 4, it is significantly effective for further increasing the output power to use a 1.48 μm/1.55 μm band filter type WDM coupler as a pump light isolator and allow additional 1.48 μm band pump light to enter the optical fiber 104.

Though the signal light having a wavelength of 1.551 μm was used, the same effects can be obtained as long as the wavelength is in the range of about 1.53 μm to 1.57 μm (1.55 μm band) or even when a plurality of signals having different wavelengths are simultaneously incident.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An erbium-doped fiber amplifier for amplifying signal light, comprising:

a first optical fiber doped with erbium ions and having an input portion and an output portion, the first optical fiber being pumped by 0.98 μm band light and amplifying the signal light;

a first pump light source for producing the 0.98 μm band light;

a first optical coupler for receiving the 0.98 μm band light from the first pump light source, and coupling the 0.98 μm band light with the signal light at the input portion of the first optical fiber;

a second optical fiber doped with erbium ions and having an input portion and an output portion, the second optical fiber being pumped by 1.48 μm band light and amplifying the signal light;

a second pump light source for producing the 1.48 μm band light; and a second optical coupler for receiving the 1.48 μm band light from the second pump light source, and coupling the 1.48 μm band light with the signal light at the output portion of the second optical fiber;

wherein a pump light isolator is installed between the output portion of the first optical fiber and the input portion of the second optical fiber, and the pump light isolator blocks the passing of the 1.48 μm band light from the input portion of the second optical fiber to the output portion of the first optical fiber so that the intensity of the 1.48 μm band light is less than that of the signal light in the first optical fiber, while the pump light isolator allows the passing of the signal light from the output portion of the first optical fiber to the input portion of the second optical fiber.

2. An erbium-doped fiber amplifier according to claim 1, wherein the pump light isolator includes an optical filter.

3. An erbium-doped fiber amplifier according to claim 1, wherein the pump light isolator includes an optical fiber-grating.

4. An erbium-doped fiber amplifier according to claim 1, wherein the pump light isolator includes an optical isolator.

5. An erbium-doped fiber amplifier according to claim 1, wherein the first pump light source includes a semiconductor laser.

6. An erbium-doped fiber amplifier according to claim 1, wherein the second pump light source includes a semiconductor laser.

7. An erbium-doped fiber amplifier for amplifying signal light, comprising:

an optical fiber doped with erbium ions, the optical fiber being pumped by 0.98 μm band light and 1.48 μm band light and amplifying the signal light;

a first pump light source for producing the 0.98 μm band light;

a first optical coupler for receiving the 0.98 μm band light from the first pump light source, and coupling the 0.98 μm band light with the signal light;

a second pump light source for producing the 1.48 μm band light; and a second optical coupler for receiving the 1.48 μm band light from the second pump light source, and coupling the 1.48 μm band light with the signal light, wherein an emission cross section of the optical fiber at 1.48 μm band is sufficiently smaller than an absorption cross section at the 1.48 μm band so that the 1.48 μm band light will not be amplified.

8. An erbium-doped fiber amplifier according to claim 7, wherein the first pump light source includes a semiconductor laser.

9. An erbium-doped fiber amplifier according to claim 7, wherein the second pump light source includes a semiconductor laser.

10. An erbium-doped fiber amplifier for amplifying signal light, comprising:

an optical fiber doped with erbium ions, the optical fiber being pumped by 0.98 μm band light and 1.48 μm band light and amplifying the signal light;

a first pump light source for producing the 0.98 μm band light;

a first optical coupler for receiving the 0.98 μm band light from the first pump light source, and coupling the 0.98 μm band light with the signal light;

a second pump light source for producing the 1.48 μm band light; and a second optical coupler for receiving the 1.48 μm band light from the second pump light source, and coupling the 1.48 μm band light with the signal light, wherein the 1.48 μm band light has a wavelength of a level where the 1.48 μm band light will not be amplified in the optical fiber.

11. An erbium-doped fiber amplifier according to claim 10, wherein the first pump light source includes a semiconductor laser.

12. An erbium-doped fiber amplifier according to claim 10, wherein the second pumplight source includes a semiconductor laser.

13. An optical fiber communication system, comprising:

a light source for producing 1.55 μm band light as signal light;

a first optical fiber doped with erbium ions and having an input portion and an output portion, the first optical fiber being pumped by 0.98 μm band light and amplifying the signal light;

a first pump light source for producing the 0.98 μm band light;

a first optical coupler for receiving the 0.98 μm band light from the first pump light source, and coupling the 0.98 μm band light with the signal light at the input portion of the first optical fiber;

a second optical fiber eloped with erbium ions and having an input portion and an output portion, the second optical fiber being pumped by 1.48 μm band light and amplifying the signal light;

a second pump light source for producing the 1.48 μm band light; and a second optical coupler for receiving the 1.48 μm band light from the second pump light source, and coupling the 1.48 μm band light with the signal light at the output portion of the second optical fiber;

wherein a pump light isolator is installed between the output portion of the first optical fiber and the input portion of the second optical fiber, and the pump light isolator blocks the passing of the 1.48 μm band light from the input portion of the second optical fiber to the output portion of the first optical fiber so that the intensity of the 1.48 μm band light is less than that of the signal light in the first optical fiber, while the pump light isolator allows the passing of the signal light from the output portion of the first optical fiber to the input portion of the second optical fiber.

14. An optical fiber communication system according to claim 13, wherein the pump light isolator includes an optical filter.

15. An optical fiber communication system according to claim 13, wherein the pump light isolator includes an optical fiber-grating.

16. An optical fiber communication system according to claim 13, wherein the pump light isolator includes an optical isolator.

17. An optical fiber communication system according to claim 13, wherein the first pump light source includes a semiconductor laser.

18. An optical fiber communication system according to claim 13, wherein the second pump light source includes a semiconductor laser.

19. An optical fiber communication system, comprising:

a light source for producing 1.55 µm band light as signal light;

an optical fiber doped with erbium ions, the optical fiber being pumped by 0.98 µm band light and 1.48 µm band light and amplifying the signal light;

a first pump light source for producing the 0.98 µm band light;

a first optical coupler for receiving the 0.98 µm band light from the first pump light source, and coupling the 0.98 µm band light with the signal;

a second pump light source for producing the 1.48 µm band light; and a second optical coupler for receiving the 1.48 µm band light from the second pump light source, and coupling the 1.48 µm band light with the signal light, wherein an emission cross section of the optical fiber at 1.48 µm band is sufficiently smaller than an absorption cross section at the 1.48 µm band so that the 1.48 µm band light will not be amplified.

20. An optical fiber communication system according to claim 19, wherein the first pump light source includes a semiconductor laser.

21. An optical fiber communication system according to claim 19, wherein the second pump light source includes a semiconductor laser.

22. An optical fiber communication system, comprising:

a light source for producing 1.55 µm band light as signal light;

an optical fiber doped with erbium ions, the optical fiber being pumped by 0.98 µm band light and 1.48 µm band light and amplifying the signal light;

a first pump light source for producing the 0.98 µm band light;

a first optical coupler for receiving the 0.98 µm band light from the first pump light source, and coupling the 0.98 µm band light with the signal light;

a second pump light source for producing the 1.48 µm band light; and a second optical coupler for receiving the 1.48 µm band light from the second pump light source, and coupling the 1.48 µm band light with the signal light, wherein the 1.48 µm band light has a wavelength of a level where the 1.48 µm band light will not be amplified.

23. An optical fiber communication system according to claim 22, wherein the first pump light source includes a semiconductor laser.

24. An optical fiber communication system according to claim 22, wherein the second pump light source includes a semiconductor laser.

25. An erbium-doped fiber amplifier for amplifying signal light, comprising:

a first optical fiber doped with erbium ions and having an input portion and an output portion, the first optical fiber being pumped by 0.98 µm band light and amplifying the signal light;

a first pump light source for producing the 0.98 µm band light;

a first optical coupler for receiving the 0.98 µm band light from the first pump light source, and coupling the 0.98 lam band light with the signal light at the input portion of the first optical fiber;

a second optical fiber doped with erbium ions and having an input portion and an output portion, the second optical fiber being pumped by 1.48 µm band light and amplifying the signal light;

a second pump light source for producing the 1.48 µm band light; and a second optical coupler for receiving the 1.48 µm band light from the second pump light source, and coupling the 1.48 µm band light with the signal light at the output portion of the second optical fiber;

wherein a pump light isolator is installed between the output portion of the first optical fiber and the input portion of the second optical fiber, and the pump light isolator blocks the passing of the 1.48 µm band light from the input portion of the second optical fiber to the output portion of the first optical fiber so that the intensity of the 1.48 µm band light is less than that of the signal light in the first optical fiber, the pump light isolator allows the passing of the signal light from the output portion of the first optical fiber to the input portion of the second optical fiber, and the pump light isolator has a loss of about 30 dB for 1.48 µm band light.

26. An erbium-doped fiber amplifier for amplifying signal light, comprising:

a first optical fiber doped with erbium ions and having an input portion and an output portion, the first optical fiber being pumped by 0.98 µm band light and amplifying the signal light;

a first pump light source for producing the 0.98 µm band light;

a first optical coupler for receiving the 0.98 µm band light from the first pump light source, and coupling the 0.98 µm band light with the signal light at the input portion of the first optical fiber;

a second optical fiber doped with erbium ions and having an input portion and an output portion, the second optical fiber being pumped by 1.48 µm band light and amplifying the signal light;

a second pump light source for producing the 1.48 µm band light; and a second optical coupler for receiving the 1.48 µm band light from the second pump light source, and coupling the 1.48 µm band light with the signal light at the output portion of the second optical fiber;

wherein a pump light isolator is installed between the output portion of the first optical fiber and the input portion of the second optical fiber, and the pump light isolator blocks the passing of the 1.48 µm band light from the input portion of the second optical fiber to the output portion of the first optical fiber so that the intensity of the 1.48 µm band light is less than that of the signal light in the first optical fiber, the pump light isolator allows the passing of the signal light from the output portion of the first optical fiber to the input portion of the second optical fiber, and the pump light isolator prevents the 1.48 µm band pump light from entering the first optical fiber to set a NF at 3.4 dB or lower.

* * * * *

UNITED STATES PATENT AND TRADE MARK OFFICE
CERTIFICATE OF CORRECTION

PATENT NO. : 5,623,362
DATED : April 22, 1997
INVENTOR(S) : Mitsuda et al.

It is certified that error appears in the above-identified patent and that said Letters Patent is hereby corrected as shown below:

On the cover page, item [56] References Cited, add the following:

U.S. PATENT DOCUMENTS
5,210,808   5/1993   Grasso et al.

FOREIGN PATENT DOCUMENTS
4-250429   9/1992   Japan
4-250681   9/1992   Japan

OTHER DOCUMENTS
R.I. Laming, et al., "Noise Characteristics of Erbium-Doped Fiber Amplifier Pumped at 980 nm", IEEE Photonics Technology Letters, vol. 2, no. 6, pp. 418-421 (June 1990).

B. Pedersen, et al., "Power Requirements for Erbium-Doped Fiber Amplifiers Pumped in the 800, 980, and 1480 nm Bands", IEEE Photonics Technology Letters, vol. 4, no. 1, pp. 46-49 (January 1992).

J.M.P. Delavaux et al., "Hybrid Er-Doped Fibre Amplifiers at 980-1480 nm for Long Distance Optical Communications", Electronics Letters, vol. 28, no. 17, pp. 1642-1643 (August 13, 1992).

UNITED STATES PATENT AND TRADE MARK OFFICE
CERTIFICATE OF CORRECTION

PATENT NO. : 5,623,362
DATED : April 22, 1997
INVENTOR(S) : Mitsuda et al.

It is certified that error appears in the above-identified patent and that said Letters Patent is hereby corrected as shown below:

Y. Aoki et al., "Low Noise and High Saturation Output Power Erbium-Doped Fiber Amplifiers Pumped with 0.98µm and 1.48µm LDs for Long-Distance Optical Communication", IOOC-ECOC'91, pp. 585-587.

M. Yamada, et al., "Noise Characteristics of $Er^3+$-Doped Fiber Amplifiers Pumped by 0.98 and 1.48 µm Laser Diodes", IEEE Photonics Technology Letters, vol. 2, no. 3 pp. 205-207 (March 1990).

"High-Gain Two-Stage Amplication with Erbium Doped Fibre Amplifier", Electronics Letters, vol. 26, no. 10, pp. 661-662 (May 10, 1990).

C.R. Giles, et al., "Propagation of Signal and Noise in Concatenated Erbium-Doped Fiber Optical Amplifiers", Journal of Lightwave Technology, vol. 9, no. 2, pp. 147-154 (February 1991).

S. Yamashita et al., "Analysis of Optical Fiber Amplifiers: Performance Improvement with a Midway Isolator and Performance Degradation Induced by Terminal Reflection", The Institute of Electronics, Information and Communication Engineers, Optical Communication System Society, pp. 9-16, (June 30, 1992).

M. Mitsuda et al., "Output Power and Noise Figure Characteristics of 0.98 µM and 1.48 µM Hybrid Pumped EDFA", The Institute of Electronics, Information and Communication Engineers, 1993 Spring convention paper, no. 4, C-297.

UNITED STATES PATENT AND TRADE MARK OFFICE
CERTIFICATE OF CORRECTION

PATENT NO. : 5,623,362
DATED : April 22, 1997
INVENTOR(S) : Mitsuda et al.

It is certified that error appears in the above-identified patent and that said Letters Patent is hereby corrected as shown below:

Column 14, line 21, "pumplight" should be --pump light--.

Column 14, line 37, "eloped" should be --doped--.

Column 16, line 3, "lam" should be --μm--.

Signed and Sealed this

Twenty-fourth Day of March, 1998

Attest:

BRUCE LEHMAN

Attesting Officer

Commissioner of Patents and Trademarks